US010635590B2

(12) United States Patent
Wang et al.

(10) Patent No.: US 10,635,590 B2
(45) Date of Patent: Apr. 28, 2020

(54) SOFTWARE-TRANSPARENT HARDWARE PREDICTOR FOR CORE-TO-CORE DATA TRANSFER OPTIMIZATION

(71) Applicant: Intel Corporation, Santa Clara, CA (US)

(72) Inventors: Ren Wang, Portland, OR (US); Joseph Nuzman, Haifa (IL); Samantika S. Sury, Westford, MA (US); Andrew J. Herdrich, Hillsboro, OR (US); Namakkal N. Venkatesan, Hillsboro, OR (US); Anil Vasudevan, Portland, OR (US); Tsung-Yuan C. Tai, Portland, OR (US); Niall D. McDonnell, Limerick (IE)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 15/721,249

(22) Filed: Sep. 29, 2017

(65) Prior Publication Data

US 2019/0102303 A1    Apr. 4, 2019

(51) Int. Cl.
*G06F 12/08* (2016.01)
*G06F 12/0831* (2016.01)
(Continued)

(52) U.S. Cl.
CPC ........ *G06F 12/0831* (2013.01); *G06F 12/084* (2013.01); *G06F 12/0811* (2013.01);
(Continued)

(58) Field of Classification Search
CPC ......... G06F 2212/621; G06F 2212/282; G06F 12/128; G06F 12/0848; G06F 12/0831;
(Continued)

(56) References Cited

U.S. PATENT DOCUMENTS 4,853,846 A * 8/1989 Johnson ................ G06F 9/3802
                                                            710/300
4,905,141 A * 2/1990 Brenza ................ G06F 12/0846
                                                            711/129
(Continued)

*Primary Examiner* — Mano Padmanabhan
*Assistant Examiner* — Jean C Edouard
(74) *Attorney, Agent, or Firm* — Nicholson De Vos Webster & Elliott LLP

(57) ABSTRACT

Apparatus, method, and system for implementing a software-transparent hardware predictor for core-to-core data communication optimization are described herein. An embodiment of the apparatus includes a plurality of hardware processor cores each including a private cache; a shared cache that is communicatively coupled to and shared by the plurality of hardware processor cores; and a predictor circuit. The predictor circuit is to track activities relating to a plurality of monitored cache lines in the private cache of a producer hardware processor core (producer core) and to enable a cache line push operation upon determining a target hardware processor core (target core) based on the tracked activities. An execution of the cache line push operation is to cause a plurality of unmonitored cache lines in the private cache of the producer core to be moved to the private cache of the target core.

24 Claims, 21 Drawing Sheets

(51) Int. Cl.
  *G06F 12/084*  (2016.01)
  *G06F 12/0811*  (2016.01)
  *G06F 9/455*  (2018.01)

(52) U.S. Cl.
  CPC .................. *G06F 9/45558* (2013.01); *G06F 2009/45583* (2013.01); *G06F 2212/283* (2013.01); *G06F 2212/314* (2013.01)

(58) Field of Classification Search
  CPC .............. G06F 12/0864; G06F 12/127; G06F 12/0804; G06F 12/0862; G06F 2212/604; G06F 12/08; G06F 12/0811; G06F 12/00; G06F 12/084; G06F 12/121; G06F 12/0808; G06F 9/45558; G06F 2009/45583; G06F 2212/283; G06F 12/123; G06F 2212/314; G06F 12/0846
  USPC ........................................................ 711/121
  See application file for complete search history.

(56) References Cited

U.S. PATENT DOCUMENTS

| | | | | |
|---|---|---|---|---|
| 4,985,829 A * | 1/1991 | Thatte | ................ | G06F 12/0864 711/207 |
| 5,073,891 A * | 12/1991 | Patel | .................... | G11C 29/14 714/718 |
| 5,893,920 A * | 4/1999 | Shaheen | ............ | G06F 12/0813 711/133 |
| 6,339,813 B1 * | 1/2002 | Smith, III | ........... | G06F 12/0859 711/133 |
| 6,694,407 B1 * | 2/2004 | May | .................... | G06F 12/0842 711/129 |
| 7,558,920 B2 * | 7/2009 | Mattina | ................ | G06F 12/084 711/133 |
| 7,571,285 B2 * | 8/2009 | Hughes | ................ | G06F 12/084 711/130 |
| 8,028,129 B2 * | 9/2011 | Hughes | ................ | G06F 12/084 711/130 |
| 2006/0195662 A1 * | 8/2006 | Folio | .................... | G06F 12/0842 711/129 |
| 2007/0143546 A1 * | 6/2007 | Narad | .................... | G06F 12/084 711/130 |
| 2008/0010413 A1 * | 1/2008 | Kailas | ................ | G06F 9/30043 711/129 |
| 2009/0006755 A1 * | 1/2009 | Illikkal | ............... | G06F 11/3409 711/126 |
| 2009/0216950 A1 * | 8/2009 | McCalpin | ........... | G06F 12/0833 711/122 |
| 2010/0318742 A1 * | 12/2010 | Plondke | ............. | G06F 12/1036 711/123 |
| 2011/0145501 A1 * | 6/2011 | Steely, Jr. | ........... | G06F 12/0806 711/121 |
| 2012/0166730 A1 * | 6/2012 | Gehnnan | ............. | G06F 13/1668 711/129 |
| 2013/0262772 A1 * | 10/2013 | Rabinovitch | ....... | G06F 12/0871 711/128 |
| 2014/0281239 A1 * | 9/2014 | Novakovsky | ....... | G06F 12/0891 711/122 |
| 2014/0281248 A1 * | 9/2014 | Alameldeen | ........ | G06F 12/0864 711/128 |

\* cited by examiner

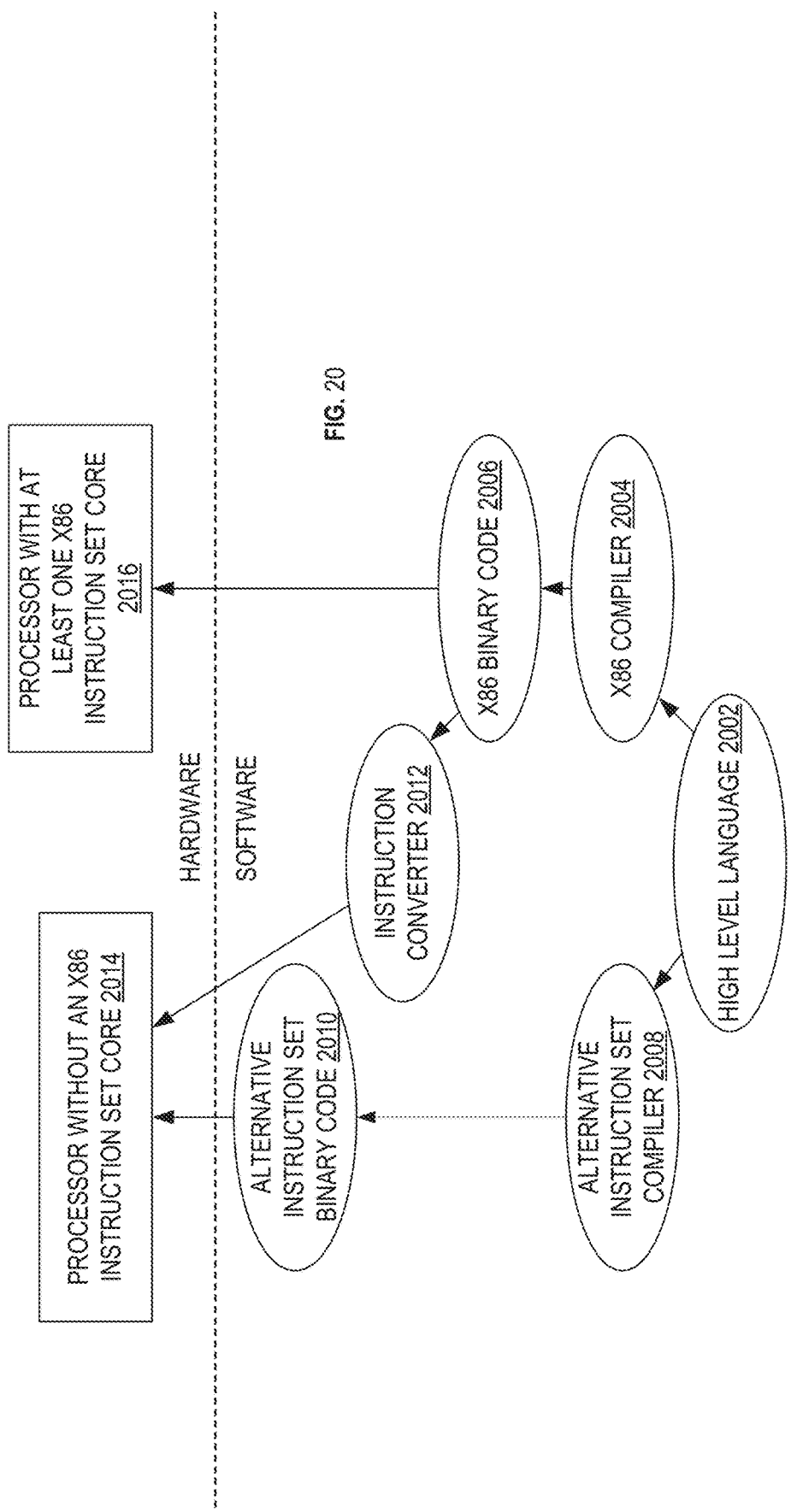

SOFTWARE-TRANSPARENT HARDWARE PREDICTOR FOR CORE-TO-CORE DATA TRANSFER OPTIMIZATION

BACKGROUND INFORMATION

Access to computer networks has become a ubiquitous part of today's computer usage. Whether accessing a Local Area Network (LAN) in an enterprise environment to access shared network resources, or accessing the Internet via the LAN or other access point, it seems users are always logged on to at least one service that is accessed via a computer network. Moreover, the rapid expansion of cloud-based services has led to even further usage of computer networks, and these services are forecast to become ever-more prevalent.

Networking is facilitated by various types of equipment including routers, switches, bridges, gateways, and access points. Large network infrastructure typically includes use of telecommunication-class network elements, including switches and routers made by companies such as Cisco Systems, Juniper Networks, Alcatel Lucent, IBM, and Hewlett-Packard. Such telecom switches are very sophisticated, operating at very-high bandwidths and providing advanced routing functionality as well as supporting different Quality of Service (QoS) levels. Private networks, such as Local area networks (LANs), are most commonly used by businesses and home users. It is also common for many business networks to employ hardware- and/or software-based firewalls and the like.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 20 illustrates a block diagram contrasting the use of a software instruction converter to convert binary instructions in a source instruction set to binary instructions in a target instruction set according to embodiments of the invention.

DETAILED DESCRIPTION

Figure 1:
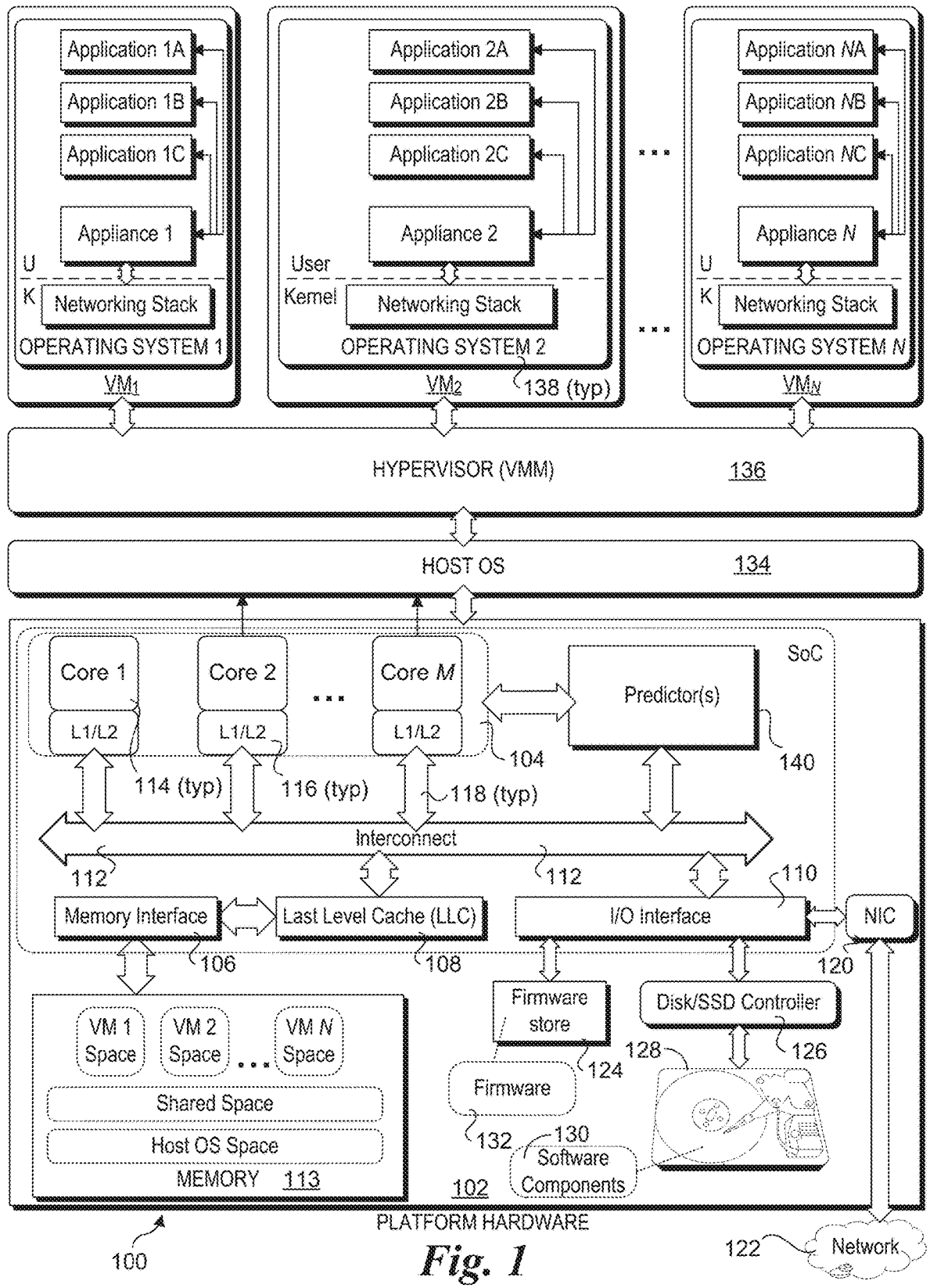
FIG. 1 is a schematic diagram illustrating an exemplary host platform configuration including platform hardware and various software-based components including NFV components.

In recent years, virtualization of computer systems has seen rapid growth, particularly in server deployments and data centers. Under a conventional approach, a server runs a single instance of an operating system directly on physical hardware resources, such as the central processing unit (CPU), random access memory (RAM), storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based operating system (OS) virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

Today there are large amount of proprietary network appliances that make additions and upgrades more and more difficult. Such network appliance include routers, firewalls, etc. which maintain real-time state of subscriber mobility, voice and media calls, security, contextual content management, etc. NFV technology consolidates these network functions onto general purpose X86 servers and can greatly reduce the configuration and upgrading complexity.

When several NFVs are consolidated, e.g., implemented as a set of Virtual Machines (VM) in one platform, it requires very efficient network packet handing due to the nature of the workloads and the high line-rate of current (10 Gigabits per second (Gbps)) and future (40 Gbps and 100 Gbps) network interfaces. On a multicore X86 server, those packets are forwarded (via inter-VM communication) and processed by NFV modules in VMs on different cores.

Under recent testing of a conventional implementation, it has been observed that the packet throughput of inter-VM communication, especially for small packets (e.g., 64B, which is important to telecommunication companies) are far from satisfactory. There are several performance bottlenecks, in terms of both software and hardware inefficiencies.

A solution that has been developed comprises proactively demoting network packets to memory shared by VMs and thus reduce the memory retrieve and copy overhead associated with inter-VM access. This solution, however, is still not perfect as accesses to shared memory is tend to be more costly than accesses to a VM's own local memory. Ideally, in a producer-consumer model, network packets produced by a producer VM should be "pushed" into the consumer VM's local memory for quick access and processing. Aspects of the present invention help provide this additional level of optimization.

Embodiments of apparatus, method, and system for implementing a software-transparent, target-aware hardware predictor for improving core-to-core data communication for NFVs and other producer-consumer workloads are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well.

FIG. 1 shows an exemplary host platform configuration 100 including platform hardware 102 and various software-based components including NFV components. Platform hardware 102 includes a central processing unit (CPU) 104 coupled to a memory interface 106, a last level cache (LLC) 108, an input/output (I/O) interface 110, and one or more predictors 140 via an interconnect 112. In some embodiments, all or a portion of the foregoing components may be integrated on a System on a Chip (SoC). Memory interface 106 is configured to facilitate access to system memory 113, which will usually be separate from the SoC.

CPU 104 includes a core portion including M processor cores 114, each including a local level 1 (L1) and level 2 (L2) cache 116. Optionally, the L2 cache may be referred to as a "middle-level cache" (MLC). As illustrated, each processor core 114 has a respective connection 118 to interconnect 112 and operates independently from the other processor cores.

For simplicity, interconnect 112 is shown as a single double-ended arrow representing a single interconnect structure; however, in practice, interconnect 112 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for I/O access and employ non-coherent domains. The interconnect structure on the processor or SoC may include any existing interconnect structure, such as buses and single or multi-lane serial point-to-point, ring, or mesh interconnect structures.

I/O interface 110 is illustrative of various I/O interfaces provided by platform hardware 102. Generally, I/O interface 110 may be implemented as a discrete component (such as an ICH (I/O controller hub) or the like), or it may be implemented on an SoC. Moreover, I/O interface 110 may also be implemented as an I/O hierarchy, such as a Peripheral Component Interconnect Express (PCIe™) I/O hierarchy. I/O interface 110 further facilitates communication between various I/O resources and devices and other platform components. These include a Network Interface Controller (NIC) 120 that is configured to facilitate access to a network 122, and various other I/O devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, VM1-N, each of which will be configured to use various portions (i.e., address spaces) of system memory 113. In turn, each virtual machine VM1-N may be employed to host a respective operating system 1381-N.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among VM1-N. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each VM1-N is depicted as hosting a similar set of software applications; however, this is merely for illustrative purposes, as the VMs for a given platform may host similar applications, or may host different applications. Similarly, each VM1-N may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch in the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, cloud workloads usually achieve a packet transfer rate of around one million packets per second between two VMs. Telco workloads, which typically use highly optimized software stacks and libraries, can usually achieve packet transfer rates of about ten million packets per second between two VMs.

Figure 2:
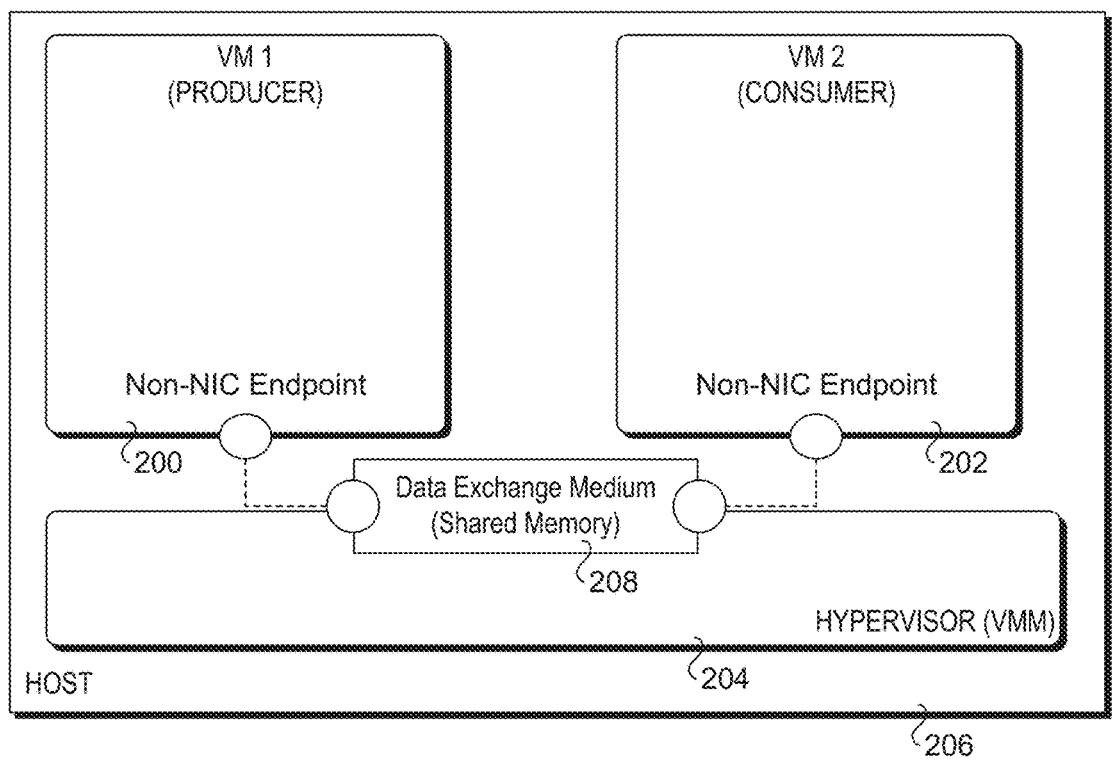
FIG. 2 is a schematic diagram illustrating a producer-consumer model employing shared memory.

The most efficient inter-VM solution currently in the art rely on a shared memory as the data medium for packet communication, as shown in FIG. 2, which depicts a pair of VMs 200 and 202 and a hypervisor 204 running on a host platform 206. VM 200 is a producer, which writes a packet into the shared memory, which comprises data exchange medium 208, while the VM 202 is a consumer that reads the packet from the shared memory. In order to keep data correctness, there is also a "ready" flag (not shown) used to guarantee the producer and consumer do not over-run each other.

As mentioned above, there is a lot of VM and network stack related software overhead involved in this case that prevents the packet throughput from reaching the bandwidth upper bound of the host platform's memory system. In order to separate the pure software overhead (which could eventually be addressed by many ongoing software optimization efforts), an IPC memory benchmark was used to emulate the inter-VM packet communication in terms of memory access behaviors to study the hardware bottlenecks.

The benchmark that was used for the emulation is called mempipe-spin (Smith et al., *Draft: Have you checked your IPC performance lately?*, UNENIX 2012). Its data-path behavior mimics the inter-VM communication described above, minus the VM overheads, with shared ring memory for producer thread and consumer thread, and a ready flag that needs to be checked before read or write operation. The consumer uses a pull mode to check if the flag is ready, which is very similar to the pull model used in DPDK packet processing.

Figure 3:
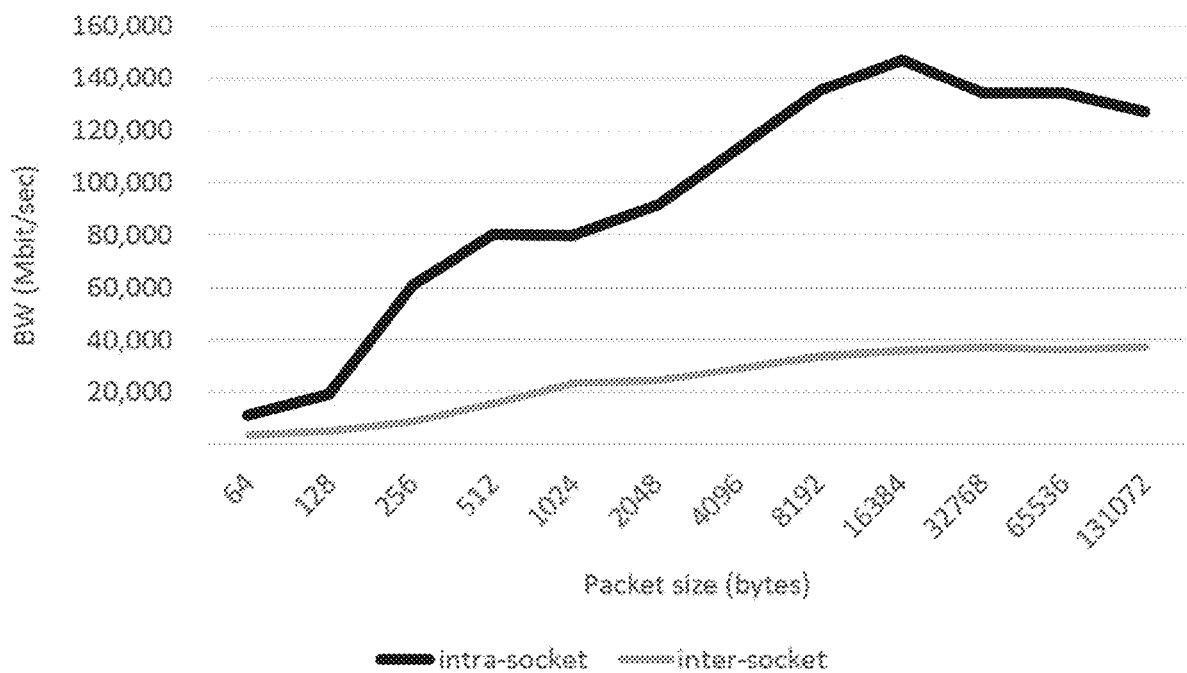
FIG. 3 is a graph comparing data transfer bandwidths for intra-socket and inter-socket communications.

FIG. 3 shows the throughput performance of mempipe-spin, with 2 threads running on 2 cores within a socket, and also 2 threads running on different sockets. From FIG. 3, we have two main observations. First, the throughput for communications within the socket, especially with smaller packet size, is far from the physical bandwidth limitation. Second, when the producer and consumer are on different sockets, the throughput performance becomes much worse.

During a producer-consumer data transfer, a first thread running on the producer writes a chunk of data (also referred to as a data object), which is then read by one or more other threads (depending on the number of consumers and the software architecture). When the data exchange medium is shared memory, on an abstract level this involves the producer writing data into a location in shared memory (e.g., at an address at which the data object is stored), and the consumer thread(s) accessing that location in shared memory. Easy and straightforward; that is, until you consider that the shared memory location may be replicated across different locations in system memory and various caches.

To illustrate this, we'll start off with a simple example illustrating a software application comprising a producer accessing data so that the software application can modify the data prior to sending it to a consumer. This is shown in FIG. 4a, which shows further detail to the platform hardware and software architectures depicted in FIG. 1.

In virtualized environments employing many VMs, it is a preferred practice to allocate a physical or logical processor core to each VM. This enables multiple threads corresponding to a given guest operating system processes and applications running on the guest OS to be executed on the same core. It also significantly improves memory accesses via the use of L1 and L2 caches for the core, as will become more evident below. Accordingly, in some of the Figures herein, VMs are shown as running on respective cores, recognizing that there may be instances in which a single core may host multiple VMs. While it is possible for the processes for a single VM to run on multiple cores (e.g., for a personal computer running a single VM such as an Apple Macintosh computer running a VM hosting a Microsoft Windows OS), that is not a likely usage scenario in SDN and NFV deployments.

As illustrated, each of the cores $114_1$ and $114_2$ include a respective L1 cache $116_1$ and $116_2$, and a respective L2 cache $118_1$ and $118_2$, each including multiple cache lines depicted as rectangular blocks. LLC 108 includes a set of LLC cache lines 430, and system memory 113 likewise includes multiple cache lines, including a set of memory cache lines 426 corresponding to a portion of shared space 406.

Figure 4A:
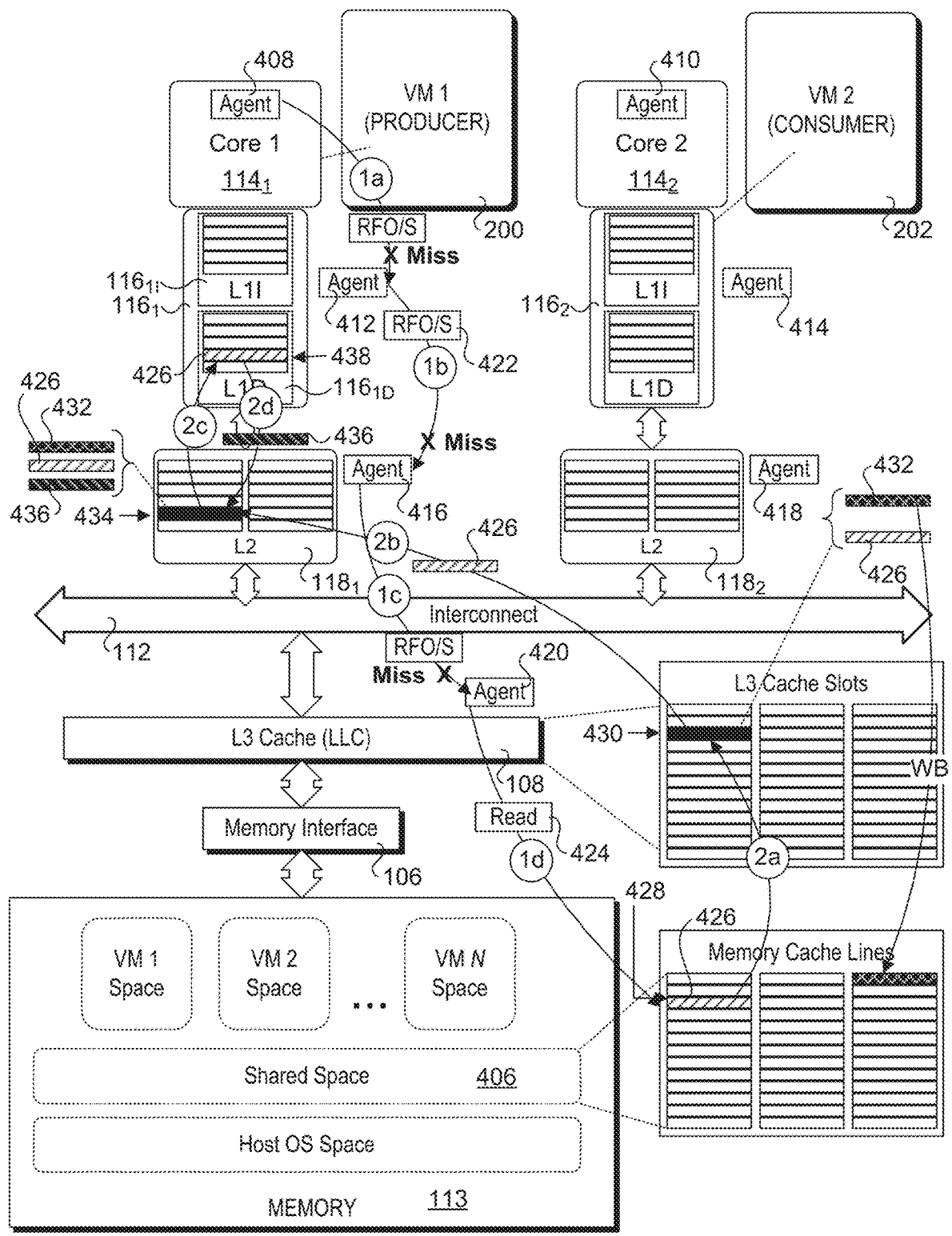
FIG. 4A is a schematic diagram illustrating access of a cache line by a producer application that is not currently stored in any cache level and is accessed from system memory, under a conventional approach.
Figure 4B:
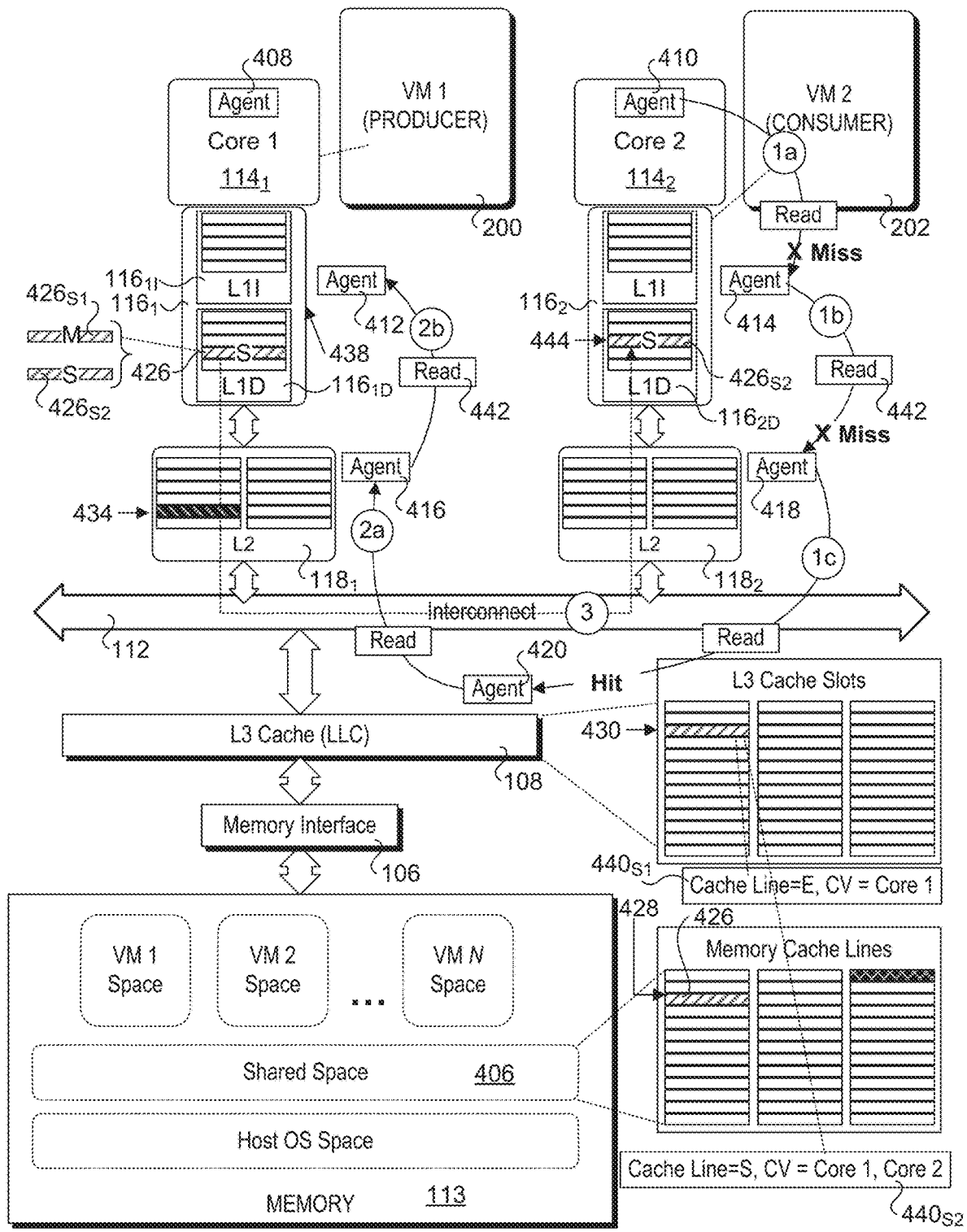
FIG. 4B is a schematic diagram illustrating a consumer application retrieving the cache line from the L1 cache of the core executing the producer application, under a conventional approach.
Figure 5:
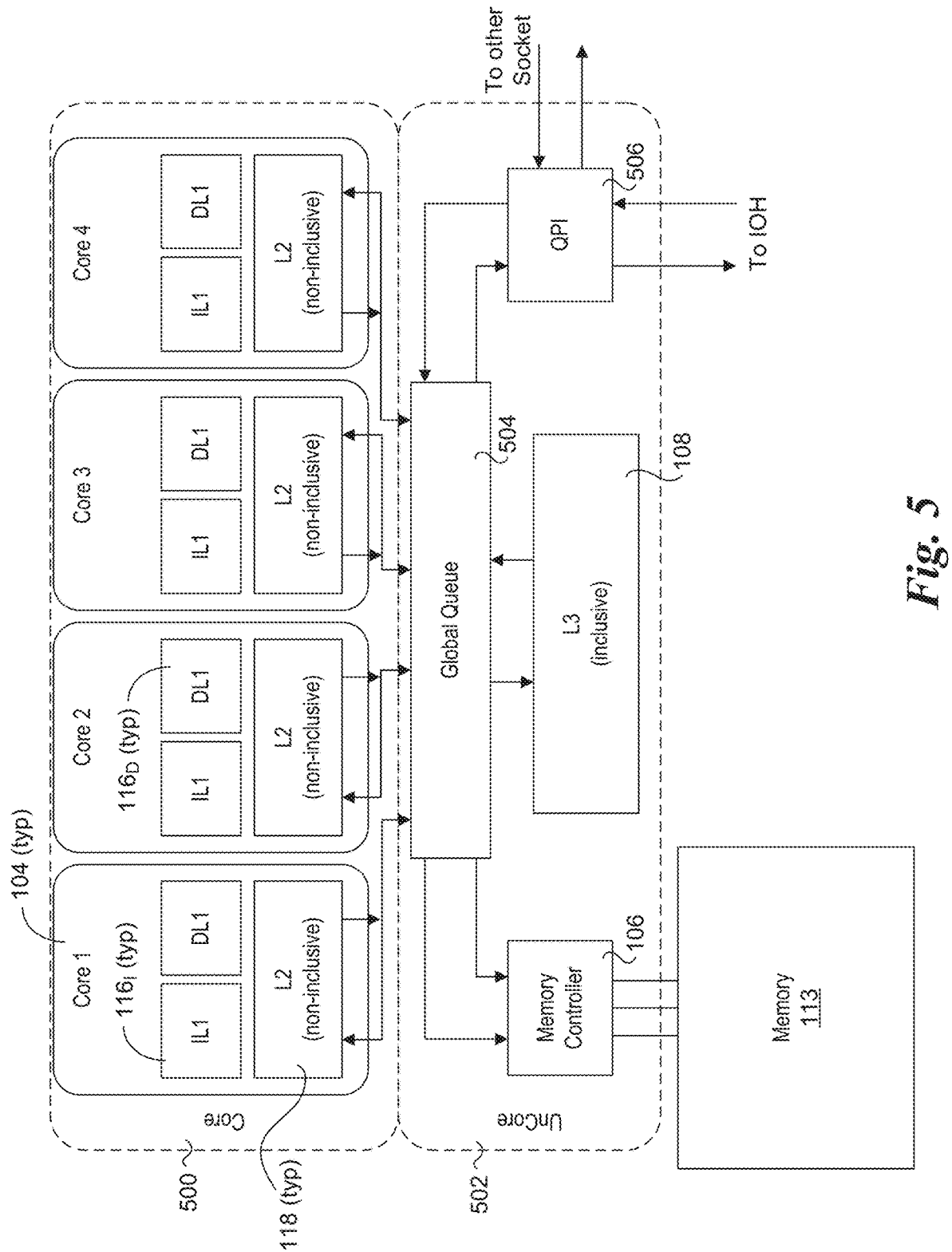
FIG. 5 is a schematic diagram illustrating an abstracted view of a memory coherency architecture employed by the platform shown in FIGS. 4a and 4b.

FIG. 5 shows an abstracted view of a memory coherency architecture employed by the embodiment of FIGS. 4a and 4b. Under this and similar architectures, such as employed by many Intel® processors, the L1 and L2 caches are part of a coherent memory domain under which memory coherency is managed by coherency mechanisms in the processor core 500. Each core 104 includes a L1 instruction (IL1) cache $116_I$, and L1 data cache (DL1) $116_D$, and an L2 cache 118. L2 caches 118 are depicted as non-inclusive, meaning they do not include copies of any cache lines in the L1 instruction and data caches for their respective cores. As an option, L2 may be inclusive of L1, or may be partially inclusive of L1. In addition, L3 may be non-inclusive of L2. As yet a first option, L1 and L2 may be replaced by a cache occupying a single level in cache hierarchy.

Meanwhile, the LLC is considered part of the "uncore" 502, wherein memory coherency is extended through coherency agents, resulting in additional overhead and processor cycles. As shown, uncore 502 includes memory controller 106 coupled to external memory 113 and a global queue 504. Global queue 504 also is coupled to an L3 cache 108, and a QuickPath Interconnect® (QPI) interface 506. Optionally, interface 506 may comprise a Keizer Technology Interface (KTI). L3 cache 108 (which functions as the LLC in this architecture) is inclusive, meaning that it includes is a copy of each cache line in the L1 and L2 caches.

As is well known, as you get further away from a core, the size of the cache levels increase, but so does the latency incurred in accessing cache lines in the caches. The L1 caches are the smallest (e.g., 32-64 KiloBytes (KB)), with L2 caches being somewhat larger (e.g., 256-640 KB), and LLCs being larger than the typical L2 cache by an order of magnitude or so (e.g., 8-16 MB). Of course, the size of these caches is dwarfed by the size of system memory (one the order of GigaBytes). Generally, the size of a cache line at a given level in a memory hierarchy is consistent across the memory hierarchy, and for simplicity and historical references, lines of memory in system memory are also referred to as cache lines even though they are not actually in a cache. It is further noted that the size of global queue 504 is quite small, as it is designed to only momentarily buffer cache lines that are being transferred between the various caches, memory controller 106, and QPI interface 506.

FIG. 4a further shows multiple cache agents that are used to exchange messages and transfer data in accordance with a cache coherency protocol. The agents include core agents 408 and 410, L1 cache agents 412 and 414, L2 cache agents 416 and 418, and an L3 cache agent 420.

FIG. 4a illustrates a simple memory access sequence in which a cache line is accessed from system memory and copied into L1 cache $116_1$ of core $114_1$. Data in system memory is stored in memory blocks (also referred to by convention as cache lines as discussed above), and each memory block has an associated address, such as a 64-bit address for today's 64-bit processors. From the perspective of applications, which includes the producers and consumers, a given chunk of data (data object) is located at a location in system memory beginning with a certain memory address, and the data is accessed through the application's host OS. Generally, the memory address is actually a virtual memory address, and through some software and hardware mechanisms, such virtual addresses are mapped to physical addresses behind the scenes. Additionally, the application is agnostic to whether all or a portion of the chunk of data is in a cache. On an abstract level, the application will ask the operating system to fetch the data (typically via address pointers), and the OS and hardware will return the requested data to the application. Thus, the access sequence will get translated by the OS as a request for one or more blocks of memory beginning at some memory address which ends up getting translated (as necessary) to a physical address for one or more requested cache lines.

Returning to FIG. 4a, the access sequence would begin with core $114_1$ sending out a Read for Ownership (RFO) message and first "snooping" (i.e., checking) its local L1 and L2 caches to see if the requested cache line is currently present in either of those caches. In this example, producer 200 desires to access the cache line so its data can be modified, and thus the RFO is used rather than a Read request. The presence of a requested cache line in a cache is referred to as a "hit," while the absence is referred to as a "miss." This is done using well-known snooping techniques, and the determination of a hit or miss for information maintained by each cache identifying the addresses of the cache lines that are currently present in that cache. As discussed above, the L2 cache is non-inclusive, making the L1 and L2 caches exclusive, meaning the same cache line will not be present in both of the L1 and L2 caches for a given core. Under an operation 1a, core agent 408 sends an RFO message with snoop (RFO/S) 422 to L1 cache agent 412, which results in a miss. During an operations 1b, L1 cache agent 412 the forwards RFO/snoop message 422 to L2 cache agent 416, resulting in another miss.

In addition to snooping a core's local L1 and L2 caches, the core will also snoop L3 cache 108. If the processor employs an architecture under which the L3 cache is inclusive, meaning that a cache line that exists in L1 or L2 for any core also exists in the L3, the core knows the only valid copy of the cache line is in system memory if the L3 snoop results in a miss. If the L3 cache is not inclusive, additional snoops of the L1 and L2 caches for the other cores may be performed. In the example of FIG. 4a, L2 agent 416 forwards RFO/snoop message 422 to L3 cache agent 420, which also results in a miss. Since L3 is inclusive, it does not forward RFO/snoop message 422 to cache agents for other cores.

In response to detecting that the requested cache line is not present in L3 cache 108, L3 cache agent 420 sends a Read request 424 to memory interface 106 to retrieve the cache line from system memory 113, as depicted by an access operation 1d that accesses a cache line 426, which is stored at a memory address 428. As depicted by a copy operation 2a, the Read request results in cache line 426 being copied into a cache line slot 430 in L3 cache 108. Presuming that L3 is full, this results in eviction of a cache line 432 that currently occupies slot 430. Generally, the selection of the cache line to evict (and thus determination of which slot in the cache data will be evicted from and written to) will be based on one or more cache eviction algorithms that are well-known in the art. If cache line 432 is in a modified state, cache line 432 will be written back to memory 113 (known as a cache write-back) prior to eviction, as shown. As further shown, there was a copy of cache line 432 in a slot 434 in L2 cache $118_1$, which frees this slot. Cache line 426 is also copied to slot 434 during an operation 2b.

Next, cache line 426 is to be written to L1 data cache $116_{1D}$. However, this cache is full, requiring an eviction of one of its cache lines, as depicted by an eviction of a cache line 436 occupying a slot 438. This evicted cache line is then written to slot 434, effectively swapping cache lines 426 and 436, as depicted by operations 2c and 2d. At this point, cache line 426 may be accessed (aka consumed) by core $114_1$.

Oftentimes, as described above with reference to FIG. 2, a first NFV appliance (the producer) will generate data corresponding to a first object (e.g., modify the first object), and subsequently a second NFV appliance (the consumer) will want to access the object. In one case, multiple NFV appliances may want to simply read that same object's data. An illustration of an example of how this is done under a conventional approach is shown in FIG. 4b.

At the start of the process, there are three copies of cache line 426—one in memory 113, one in slot 430 of L3 cache 108 and the other in slot 434 of L1 data cache $116_{1D}$. Cache line 430 holds data corresponding to a data object. (For simplicity, only a single cache line is shown; in practice, the data for a data object will generally span multiple cache lines.) The consumer, executing on Core 2, desires to access the data object, which it knows is located at memory address 428 (per corresponding software object code executing on Core 2).

As further depicted in FIG. 4b, L3 cache agent 420 maintains information of each cache line it stores relating to the state of the cache line and which cores have copies of the cache line. In one embodiment, core valid (CV) bits are used to indicate which core(s) have a valid copy of the cache line. When cache line 426 is copied to L3 cache 108, its cache line status data is set to indicate that cache line 426 is in the (E)xclusive state, and the CV bits indicate Core 1 has the only valid copy of the cache line, as depicted by cache line status data $440_{S1}$. Subsequently, producer 200 modifies the data object, resulting in the state of cache line 426 being updated to (M)odified state $426_{S1}$. In accordance with conventional cache coherency schemes and cache eviction policies, the modified copy of the cache line is not written to L3 cache 108 at this point.

Core 2 agent 410, will send out a Read request 442 along with a cache snoop to determine whether cache line 426 is present in either its L1 data cache $116_{2D}$ or its L2 cache $118_2$, or L3 cache 108. As depicted by operations 1a and 1b, core agent 410 sends a first cache snoop to L1 cache agent 414 requesting access to cache line 426 (e.g., Read request 422), resulting in a miss, and the snoop is forwarded to L2 cache agent 418, resulting in a second miss. As before, the Read request message with snoop is forwarded from the L2 cache agent (418) to L3 cache agent 420.

L3 cache agent 420 checks to see if a copy of cache line 426 is present in L3 cache 108, resulting in a hit. L3 cache agent 420 the checks cache line status data $440_{S1}$ and determines the Core 1 has exclusive ownership of cache line 426. Since a cache line in an exclusive state can be modified by its owner, it is possible that cache line 426 has been modified (in this case it has), and thus the copy of cache line 426 held by L3 cache 108 is not current. Accordingly, L3 cache agent 420 sends the read request to the L1 and L2 cache agents for Core 1, as depicted by operations 2a and 2b eventually being serviced by L1 cache agent 412.

In response to receiving Read request 442, a copy of modified cache line 426 will be forwarded from L1 data cache $116_{1D}$ to L1 data cache $116_{2D}$ via interconnect 112 and written to a slot 444, as depicted by an operation 3. In addition, each copy of cache line 426 in L1 data cache $116_{1D}$ and L1 data cache $116_{2D}$ will be marked as (S)hared, as depicted by cache line states $426_{S2}$. For simplicity, existing cache lines in one or more of L1 data cache $116_{2D}$ and L2 cache $118_2$ that might be evicted as a result of copying cache line 426 are not shown, but similar results to those illustrated in FIG. 4a and discussed above may be expected if L1 data cache $116_{2D}$ and L2 cache $118_2$ are full.

In connection with operation 3, the copy of cache line 426 in L3 cache 108 is also updated to reflect the modified data in cache line 426. Additionally, the cache line 426 status data is updated to reflect that cache line 426 is now shared by both Core 1 and Core 2, as depicted by cache line status data $440_{S2}$.

Each snoop has an associated cycle cost accruing latency, and consumes bandwidth on the processor's interconnects. Moreover, while a processor core is waiting for access to its requested data, processing of the thread requesting the access is stalled.

Figure 6:
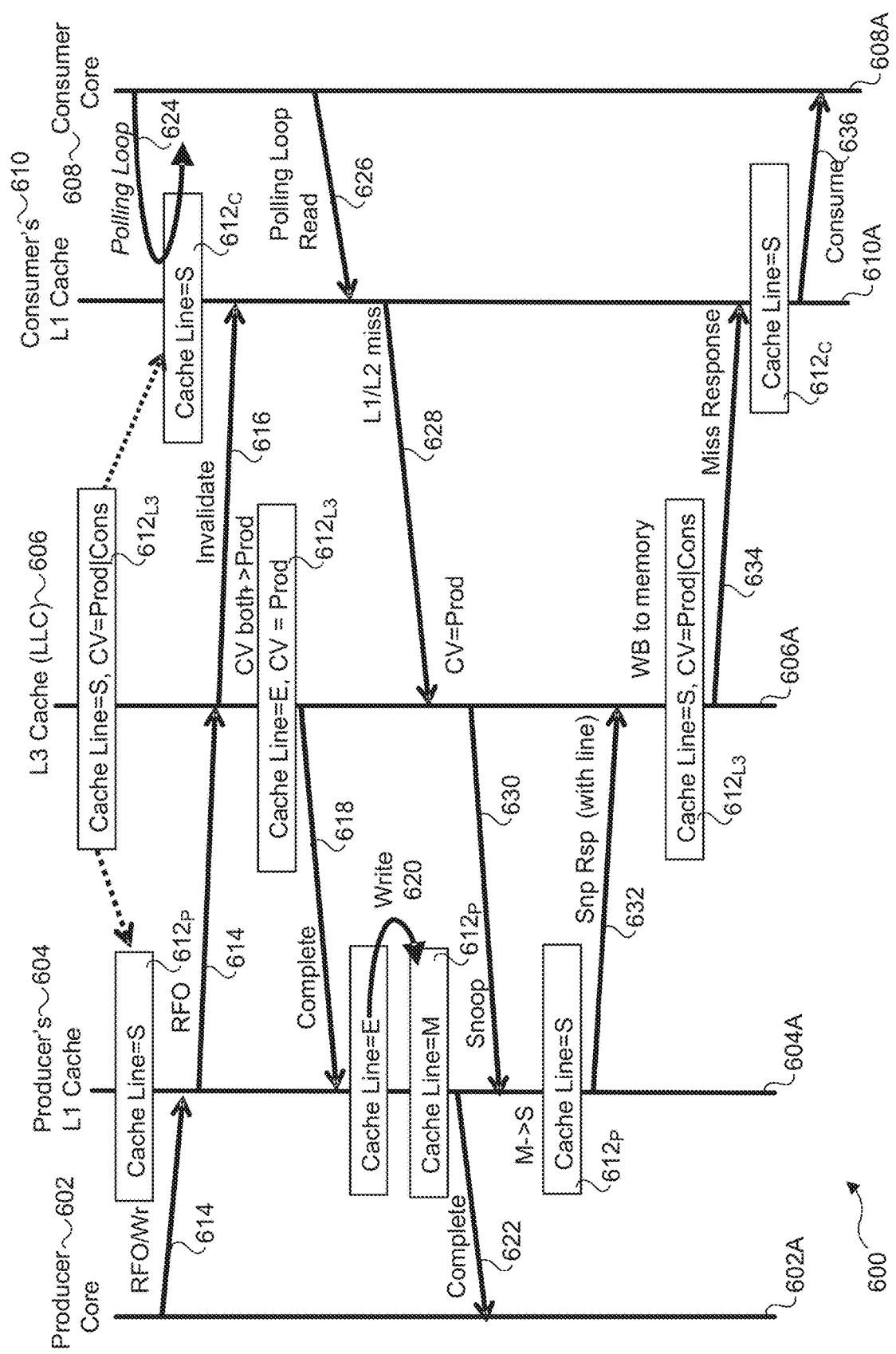
FIG. 6 is a message flow diagram illustrating a producer core assessing a cache line held in an L3 cache and modifying it, and a consumer core accessing the same cache line after the cache line has been modified, under a conventional approach.

A more complex memory access sequence is illustrated in FIG. 6, which shows a message flow diagram 600 implemented on a computer platform comprising a producer core 602 including a producer's L1 cache 604, an L3 cache (e.g., LLC) 606, and a consumer core 608 having a consumer's L1 cache 610. Each of these components has a respective agent, as depicted by agents 602A, 604A, 606A, 608A, and 610A. For clarity, L2 caches are not shown since in this example the copies of the cache line are in the L1 caches. However, it is understood the producer and consumer may each have a respective L2 cache, as well as other cache levels.

At an initial state, there are three copies of a cache line 612 that are currently cached in producer's L1 cache 604, L3 cache 606, and consumer's L1 cache 610, respectively depicted as cache lines $612_P$, $612_{L3}$, and $612_C$. Each of cache lines $612_P$ and $612_C$ are marked as (S)hared, while cache line $612_{L3}$ includes cache line status data identifying cache line 612 is shared and CV bits identifying that the producer core and the consumer core each holds a valid copy of the cache line.

As shown, producer core 602 desires to gain ownership of a shared cache line 602 in order to modify it. For example, if produce core 602 desires to modify its copy (cache line $612_P$) of cache line 612 by writing to it, it must first obtain ownership of the cache line. To obtain ownership of cache line 612, the producer core's agent 602A sends a Read For Ownership (RFO) (Wr)ite request 614 to agent 604A for producer's L1 cache 604. RFO 614 is forwarded by agent 604A to agent 606A for L3 cache 606. In response to receiving RFO 614, agent 606A sends an invalidate message 616 to the consumer's L1 cache agent 610A, and updates its cache line $612_{L3}$ status data to indicate the cache line is now in the (E)xclusive state, identifying the producer core 602 as the exclusive owner of cache line 612. Upon receipt of invalidate message 616, agent 610A will mark cache line $612_C$ as (I)nvalid (not shown).

Agent 606A for L3 cache 606 returns a complete message 618 to agent 604A for producer's L1 cache 604. Upon receipt, cache line $612_P$ is marked as (E)xclusive. Data is then written to cache line $612_P$ (as depicted by a Write 620), and cache line $612_P$ is marked as (M)odified. Agent 604A then returns a complete message 622 to producer core 602's agent 602A, completing the Write transaction.

Asynchronously, agent 608A for consumer core 608 periodically polls the status of cache lines in consumer's L1 cache 610, as depicted by a polling loop 624. Subsequently, agent 608A attempts to read its copy of cache line 612 (cache line $612_C$) using a polling loop read 626. Since at this point cache line $612_C$ is marked (I)nvalid, this results in an L1/L2 cache miss, and agent 610A for consumer's L1 cache 610 sends a message 628 to agent 606A identifying producer core 602 as holding the valid cache line, as identified by a corresponding CV bit. Agent 606A then sends a snoop 630 with the read request to agent 604A. In response, the state of cache line $612_P$ is changed from (M)odified to (Shared), and a snoop response 632 including a copy of cache line $612_P$ is returned to agent 606A.

Upon receiving snoop response 632, agent 606A performs a memory write-back (WB) of the cache line, and returns the status of its copy ($612_{L3}$) to (S)hared, and appropriate CV bits are set to once again identify that producer core 602 and consumer core 608 hold valid copies of the cache line. Subsequently, a cache line miss response 634 including the modified copy of cache line 612 is received by agent 610A, which is used to overwrite the data in cache line $612_C$, and mark cache line $612_C$ as (S)hared. Once in the consumer's L1 cache, the consumer core 608 consumes the cache line, as depicted by a consume operation 636.

When the foregoing cache line access sequence was tested as a producer/consumer baseline transaction on one class of processor, it took 112 processor cycles just to complete the read request. That is a significant amount of overhead, with a large amount of traffic being sent between the various agents to facilitate the transaction while maintaining cache coherency. These operations cause longer latency for each memory access of producer-consumer workload, as in inter-VM communication. As a result, testing has shown the processor is stalled for more than 50% of its cycles (i.e., >50% of CPU cycles are spent without retiring instructions).

To achieve good performance gain, a special memory instruction, called Cache line LLC Allocation (CLLA), was introduced. This memory instruction, which may also referred to as the Cache Line Demotion instruction (CLDEMOTE), immediately allocates the cache line into the LLC from the producer's MLC, so that the consumer can access the data directly from the LLC to reduce the memory reference latency. The CLLA instruction allows the software to provide application level knowledge to hardware for optimizations. By proactively pushing data to the LLC that is closer to the consumer, the communication latency is reduced by more than 2×, thus improve performance, as well as reduce the number of coherence messages (avoid consulting SF) to save energy.

Figure 7:
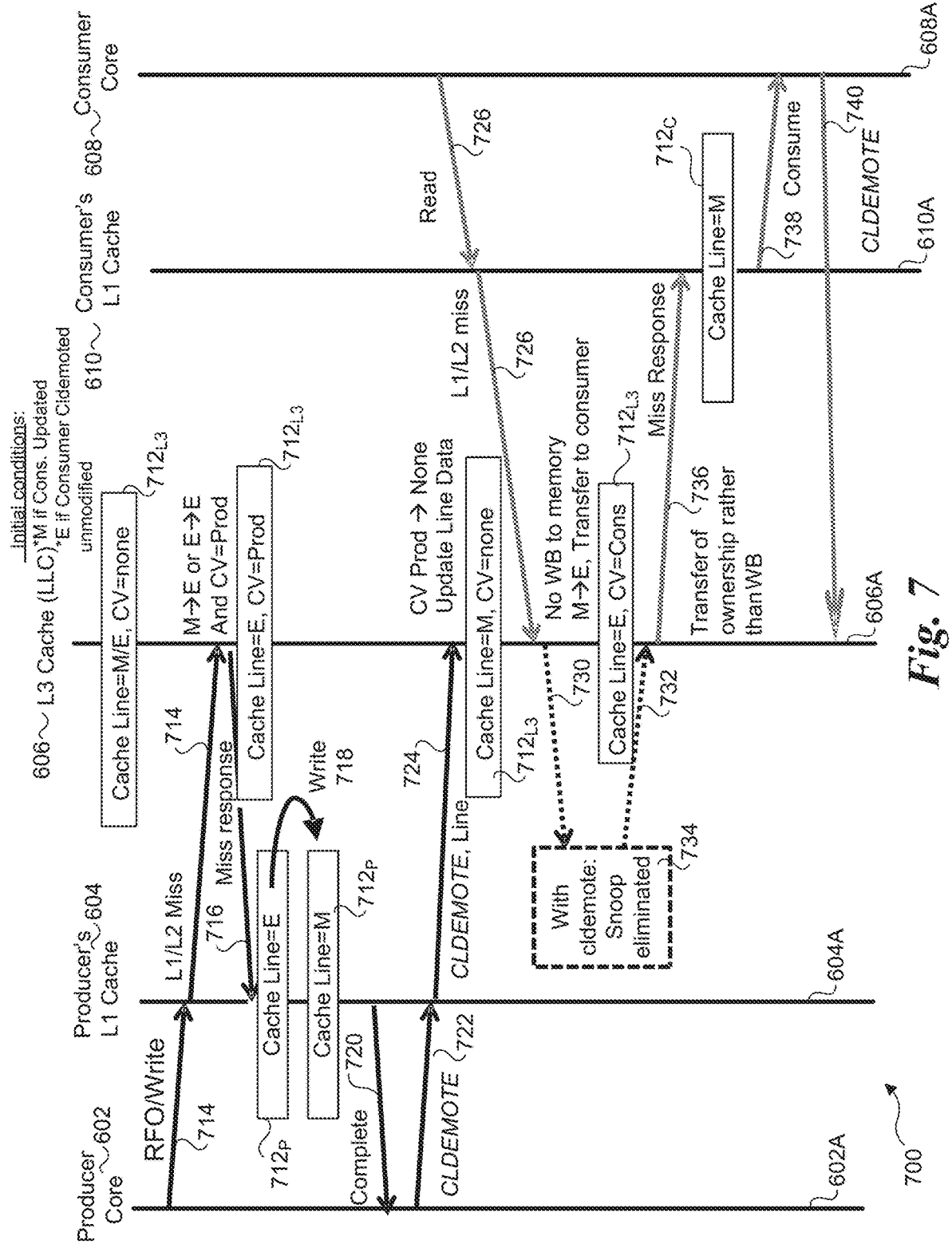
FIG. 7 is a message flow diagram illustrating a similar cache line access by the producer core and consumer core under which cache line demotion is used, according to one embodiment.

FIG. 7 shows a message flow diagram 700 corresponding to a similar pair of Write and Read transactions originating from producer core 602 and consumer core 608, respectively, that were performed in message flow diagram 600 of FIG. 6. Messages are passed between the same agents in both message flow diagrams. As a starting condition, there is a copy of cache line 712 in L3 cache 606, as depicted by cache line $712_{L3}$. The initial state of cache line $712_{L3}$ is either (M)odified, if the consumer's copy of cache line 712 has been updated, or (E)xclusive, if the consumer's copy had been CLdemoted (e.g., via the CLLA instruction) from the consumer's L1 cache unmodified. The CV is none, indicating that there is no copy of cache line present in either producer's L1 cache 604 or consumer's L1 cache 610. While only L1 caches are shown for the sake of clarity of the diagram, it is understood that the producer and consumer cores may each have a respective L2 cache, as well as other cache levels.

Similar to flow diagram 600, agent 602A for producer core 602 sends a RFO/Write message 714 to agent 604A, which results in an L1/L2 miss. In response, agent 604A forwards RFO/Write message 714 to agent 606A for L3 cache 606, which has a copy of the requested cache line (cache line $712_{L3}$). Depending on the initial state, the state for cache line $712_{L3}$ is either transitioned from (M)odified to (E)xclusive, or remains unchanged if it was already in the (E)xclusive state. The CV bits are updated to identify producer core 602 has the only valid copy of the cache line.

A copy of cache line $712_{L3}$ is returned by agent 606A to agent 604A via a message 716, as depicted by cache line $712_P$. This copy is then updated by the producer's Write 718, and marked as (M)odified. Following the update, agent 604A sends a complete message 720 to agent 602A indicating to the producer core 602 completion of the write.

Under a conventional approach, cache line $712_P$ would remain in producer's L1 cache 604 until it is evicted to a higher level cache (e.g., L3 cache). However, with the use of a CLLA instruction, the application that has modified the cache line may proactively demote cache line $712_P$ to the L3 cache. Accordingly, when a CLLA instruction is executed by the producer core 602, a CLDEMOTE message 722 is sent by agent 602A to agent 604A to demote cache line $712_P$ to L3 cache 606. In response to receiving the CLDEMOTE message 722, agent 604A sends a copy of cache line $712_P$ to agent 606A in message 724 and marks the copy in the L1 cache invalid. Upon receiving message 724, Agent 606A updates (i.e., overwrites) the existing data in cache line $712_{L3}$ with the data received in message 724, and marks cache line $712_{L3}$ as (M)odified. The CV bit in demoted cache line $712_{L3}$ is updated to reflect that no other cores have a valid copy of cache line 712.

Concurrently or thereafter, agent 608A of consumer core 608 desires to access cache line 712 and responsively sends a Read request 726 to agent 610A for cache line 712. The lookup of cache line 712 by agent 610A results in a miss and as such, agent 610A forwards Read request 726 to agent 606A. Since a modified (i.e., most recent) copy of cache line $712_P$ is already in the LLC 606 as a result of the CLLA instruction executed by producer core 602, agent 606A can simply respond to Read request 726 with its copy of the cache line $712_{L3}$ without having to snoop the cache of other cores. This eliminates the need for snoop message 730 and corresponding response 732, as depicted by block 734.

In response to Read request 726, agent 606A returns a copy of the modified cache line $712_{L3}$ in a miss response message 736 to agent 610A. This copy of the modified cache line is then written to a cache line slot in consumer's L1 cache 610, as depicted by a cache line $712_C$ with its status marked as (M)odified. Cache line $712_C$ is then retrieved from consumer's L1 cache 610 to be consumed by consumer core 608, as depicted by a consume message 738. If the application running on consumer core 608 knows it will only be reading a cache line, it can proactively demote it with the CLLA instruction, as depicted by a CLDEMOTE message 740.

Returning to cache line $712_{L3}$, in the embodiment illustrated in FIG. 7, there is no write-back to memory, even though the data in cache line $712_{L3}$ has been modified. The state of cache line $712_{L3}$ is marked as (E)xclusive, with CV set to the consumer, transferring ownership of the cache line to consumer's L1 cache 610 rather than performing a write-back to memory.

By using proactive cache line demotion with the CLLA instruction, latencies associated with memory transactions can be significantly reduced. For example, under message flow diagram 700, the number of processor cycles for the consumer Read memory access is reduced to 48 cycles. Despite this reduction, however, further optimization may still be made. As illustrated in FIG. 7, even though the modified cache line $712_P$ was demoted from producer's L1 cache 604 into the L3 cache 606 as cache line $712_{L3}$, when consumer core 608 accesses cache line 712, it still has to suffer the latencies associated with the L1/L2 miss 726 and the miss response 736. Having to access the L3 cache instead of consumer core's own MLC for data negatively impacts performance because it takes longer physically to access the L3 cache (~44 cycles) than the MLC (~14 cycles). Moreover, in situations where the communication links between the consumer core and the LLC are congested, the LLC latency could be even higher.

Ideally, in a producer-consumer workload, data produced by a producer core should be "pushed" into the consumer core's local or private cache (e.g., MLC) so that the consumer core can access the data quickly for faster processing. However, achieving this goal is a straightforward task as most hardware today do not have much information on the consumer core(s). Relying on software to indicate the consumer core for data is not practical due to factors such as complex program model, dynamic thread scheduling and migration, and/or core cache usages. Also, while prefetching from the target core could be potentially helpful via migrating the latency, software prefetch timing and code maintenance are usually very challenging and often not effective. Moreover, in many case, the target core may not know which part of the packet it needs to prefetch before actual processing.

Aspects of the present invention introduces embodiments of a hardware-only approach that extends the cache line demotion technique by pushing the shared cache lines further towards a consumer core. This may be accomplished by a simple hardware predictor that monitors the activities relating to a set of sample cache lines to adaptively determine a target core and to control the enablement of a CLPUSH operation based on real-time behavior. The activities being monitored may include accesses, such as read requests and snoops, to the sample cache lines, as well as the demotion of these sample cache lines from a producer core's local or private cache (i.e., the MLC) to a shared cache (i.e., the L3 cache or LLC). The predictor first selects N random sample cache lines from the candidates for cache line demotion and continuously monitors them. In one embodiment, for behavior tracking purposes, the selected sample cache lines are never demoted to LLC. In another embodiment, the demotion of these sample cache lines are themselves the activities being tracked. A plurality of counters is maintained to track the number of activities relating to these sample cache lines with respect to different processor cores. The activities relating to these sample cache lines may be determined from accesses (e.g., snoop requests) to these cache lines and/or information (e.g., meta data or CV bits) contained within the cache lines themselves.

For example, in one embodiment, if a snoop request to access one of the sample cache line is detected, the hardware predictor may increment the counter associated with the source of the snoop request (i.e. the core that issued the snoop request) while decrementing the counters of all the other cores currently being tracked. In another embodiment, if a demotion of one of the sample cache lines is detected, the hardware predictor may examine the meta data of the demoted cache line to determine a core that is most likely to access the demoted cache line based on prior ownership, and responsively incrementing the counter associated with the determined core and decrementing the counters associated with other cores. Additionally, the predictor may maintain a detection counter to track the total number of accesses or demotions that have been detected across all the cores. Over time, these counters will provide an indication of which core or cores are most likely to be consumer of the sample cache lines. This, in turn, allows the predictor to decide on the core or cores to push the demoted cache line towards and whether or not to enable the CLPUSH operation.

According to an embodiment, when the counter value associated with a particular core exceeds a selected threshold, that core is set as the target core and any subsequently demoted cache lines should be proactively pushed to the local or private cache (e.g., MLC) of that core. This continues until a new target core is determined. If a new target core could not be determined, then demoted cache lines are simply held in the L3 cache as normal. To simplify the discussion in the following exemplary embodiments, memory coherency protocols may be omitted and L1/L2 cache is referred to collectively as L1 cache.

Figure 8:
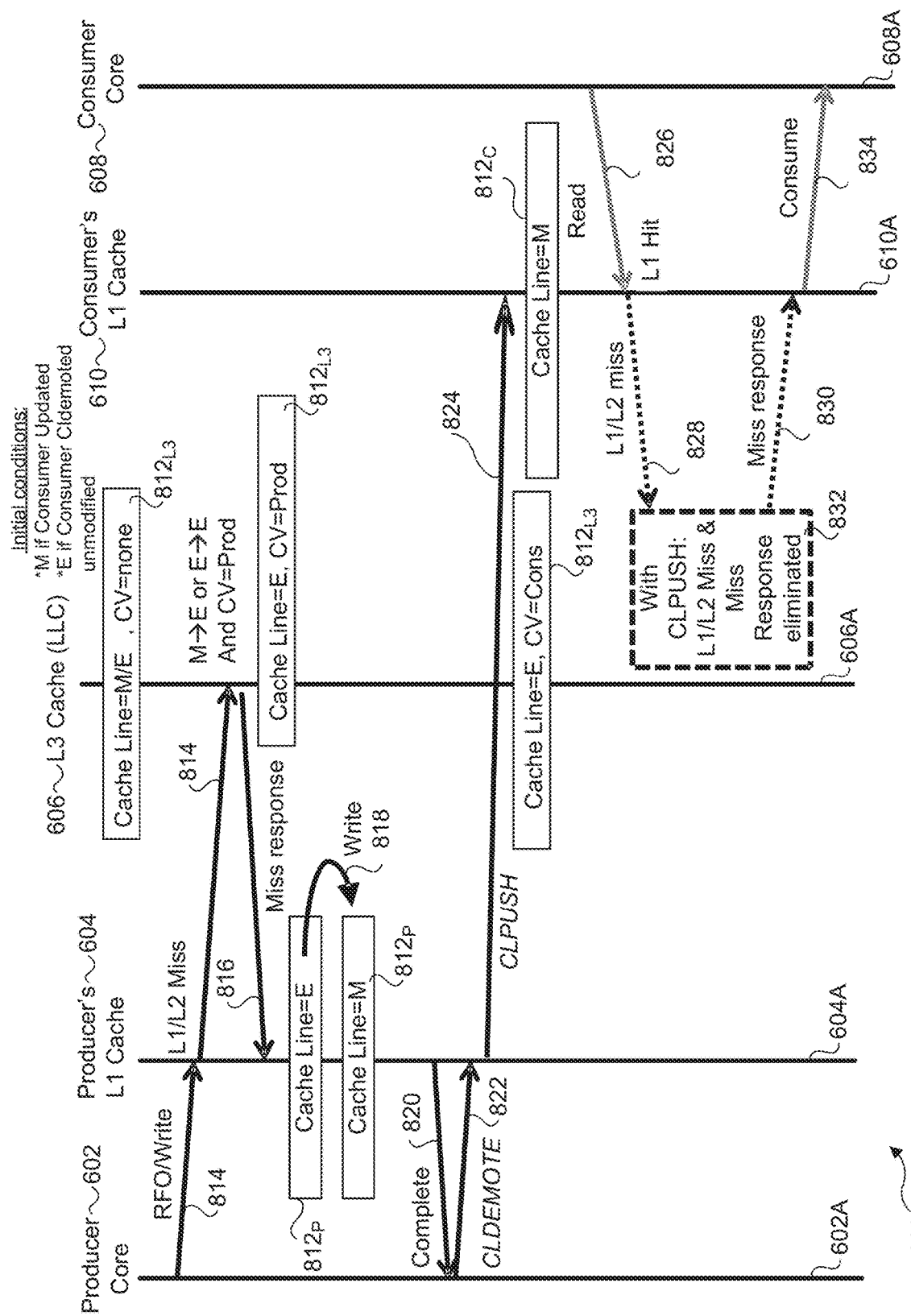
FIG. 8 is a message flow diagram illustrating accesses between a producer core and a consumer core for a shared cache, under which a cache line push operation is enabled and direct cache-to-cache data transfer is supported.

FIG. 8 shows a message flow diagram 800 corresponding to a pair of Write and Read transactions between a producer core and a consumer core when CLPUSH operation is enabled. Similar to the FIGS. 6 and 7, FIG. 8 comprises a producer core 602 and consumer core 608. Each core includes an L1 cache (604 and 610, respectively) and shares an L3 cache 606. Each of these components has a respective agent, as depicted by agents 602A, 604A, 606A, 608A and 610A. Messages are passed between these agents in the message flow diagram. While only L1 caches are shown for the sake of clarity of the diagram, it is understood that the producer and consumer cores may each have a respective L2 cache, as well as other cache levels.

At an initial state, there is a copy of cache line 812 in the L3 cache 606, as depicted by $812_{L3}$. The status of $812_{L3}$ may be either (M)odified or (E)xclusive. The CV bit is none, indicating that there are no other copies of cache line 812 in any of the other caches, such as producer's L1 cache 604 and consumer's L1 cache 610.

Initially, a producer thread in the producer core 602 desires to gain ownership of the cache line 812 so it can modify it. To obtain ownership, the producer core's agent 602A sends a RFO/Write request 814 to agent 604A of producer's L1 cache. This request results in an L1/L2 miss. Subsequently, agent 604A forwards the RFO request 814 to agent 606A of the L3 cache 606.

In response to receiving RFO message 814, agent 606A returns a copy of cache line 812 to agent 604A via message 816. Agent 604A then updates this copy of the cache line $812_P$, as depicted by write 818, in accordance to the producer core's Write request and sends a complete message 820 to agent 602A. Next, because the CLLA instruction is enabled, a cache line demotion message 822 is sent by agent 602A to agent 604A to demote cache line 812 to L3 cache 606. According to an embodiment, in response to receiving the cache line demotion message 822, agent 604A checks to see if the CLPUSH operation is enabled and if a target cache has been determined. In the case illustrated in FIG. 8, CLPUSH has been enabled and the consumer core 608 has been set as the target cache. Moreover, direct cache-to-cache transfer is supported. Accordingly, agent 604A pushes cache line 812 to the consumer's L1 cache 610 via message 824. In some embodiments, the direct cache-to-cache transfer may include temporarily allocating cache line 812 into the shared cache (e.g., L3 cache). In one embodiment, the status of cache line $812_{L3}$ in L3 cache 606 is updated to (E)xclusive and the CV bit is updated to reflect that the consumer core 608 has ownership of cache line 812. Upon receiving cache line 824 from producer's L1 cache agent 604A, the consumer's L1 cache agent 610A stores the received cache line in the consumer's L1 cache 610, as illustrated by cache line $812_C$. While cache line 812 is shown to be pushed to the consumer's L1 cache 610 in message 824, it is understood that under the CLPUSH operation, cache line 812 could be pushed to any local or private cache on the consumer core 608, such as consumer's L2 cache (not shown).

Thereafter, consumer core 608 initiates a read for cache line 812 via read request 826. Since the requested cache line has already been proactively pushed into the consumer core's L1 cache 610 by the CLPUSH operation, agent 610A can quickly respond to the read request with cache line $812_C$ to be consumed by core 608 as depicted by message 834. As a result of the CLPUSH operation, latencies associated with the L1/L2 miss 828 and the corresponding miss response 830 are eliminated, as depicted by 832. If the requested cache line was pushed to consumer core's L2 cache instead of the L1 cache, then the read request 826 would eliminate the L2 miss and the corresponding miss response (not shown).

Figure 9:
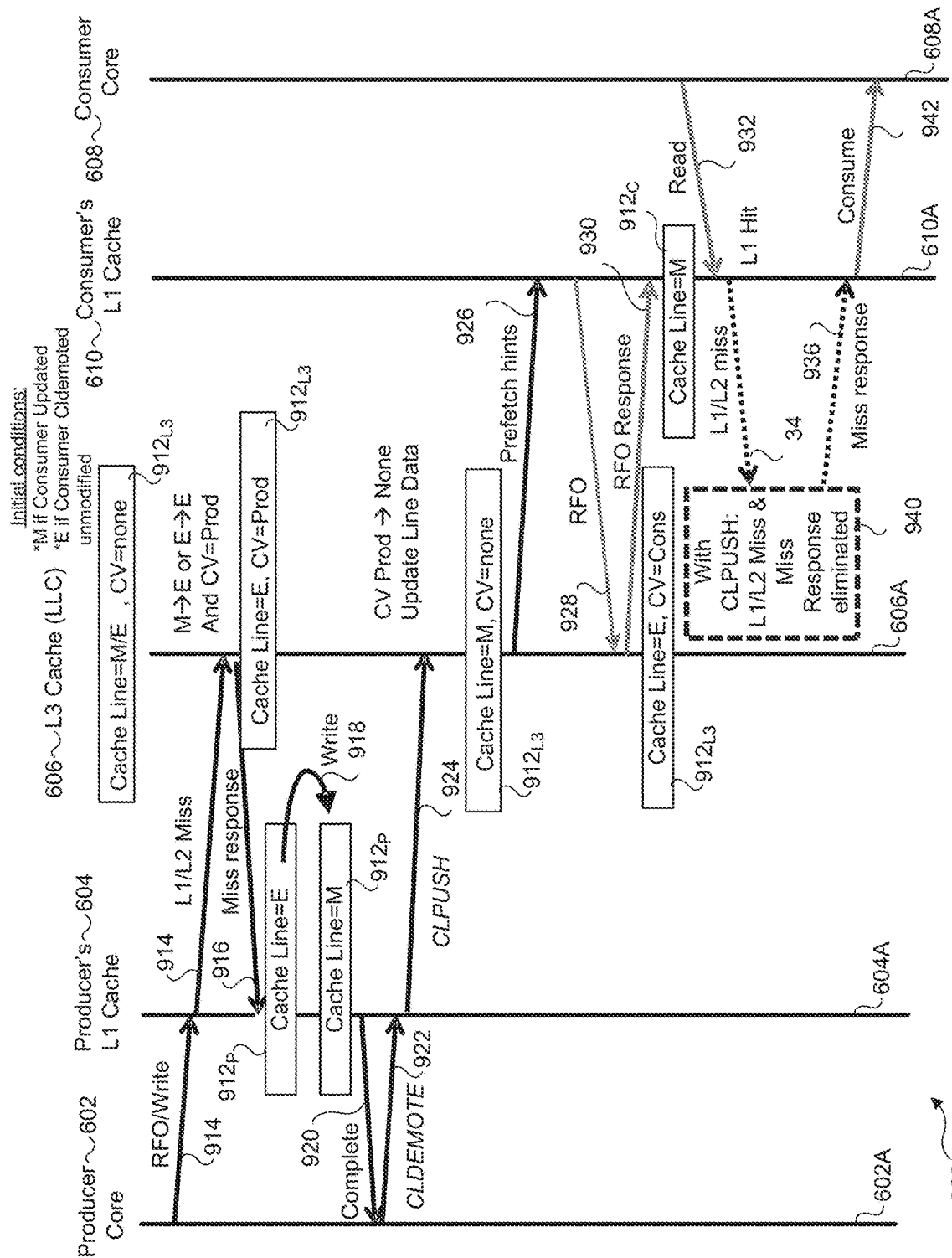
FIG. 9 is a message flow diagram illustrating accesses between a producer core and a consumer core for a shared cache, under which a cache line push operation is enabled but direct cache-to-cache data transfer is not supported.

FIG. 9 illustrates a message flow diagram 900 corresponding to a similar pair of Write and Read transactions that were performed in message flow diagram 800 of FIG. 8. The difference between the two figures is that FIG. 8 illustrates a flow diagram when direct cache-to-cache transfer is supported while FIG. 9 illustrates when direct cache-to-cache transfer is not supported.

At an initial state, there is a copy of cache line 912 in the L3 cache 606, as depicted by $912_{L3}$. The status of $912_{L3}$ may be either (M)odified or (E)xclusive. The CV bit is none, indicating that there are no other copies of cache line 912 in any of the other caches, such as producer's L1 cache 604 and consumer's L1 cache 610. Then, agent 602A for the producer core 602 sends a RFO/Write message 914 to agent 604A which results in an L1/L2 miss. In response, agent 604A forwards the RFO/Write request 914 to agent 606A for the L3 cache 606. A copy of cache line 612 is returned by agent 606A to agent 604A via response message 916. Upon receipt of a copy of cache line 612, it is stored in producer's L1 cache 604 as cache line $612_P$ with an (E)xclusive status. Agent 604A then updates cache line $612_P$ according to the producer thread's write request, as depicted by write 918, and returns a complete message 920 to agent 602A indicating completion of the task. Next, because the CLLA instruction is enabled, a cache line demotion message 922 is sent by agent 602A to agent 604A to demote cache line 912 to L3 cache 606. According to an embodiment, in response to receiving the cache line demotion message 922, agent 604A checks with a hardware predictor to see if the CLPUSH operation is enabled and if a target cache has been determined. In the case illustrated in FIG. 9, the consumer core 608 has been set as the target core and CLPUSH operation is enabled. Direct cache-to-cache transfer, however, is not supported. In this case, similar to a normal CLDEMOTE instruction, agent 604A pushes cache line 612 to the L3 cache via message 924. Agent 606A of the L3 cache then updates cache line $912_{L3}$ with the newly received data and set the cache line status to (E)xclusive and the CV bit to none to indicate that no other copies of cache line 612 exists. Next, since the CLPUSH operation is enabled, agent 606A sends prefetch hints 926 to the target core's local cache agent (e.g., consumer's L1 cache agent 610A). Upon receiving the prefetch hints cache agent 610A sends an RFO message 928 to prefetch cache line 912. Agent 606A then sends its copy of the cache line to agent 610A via RFO response 930. The fetched cache line is then stored in the consumer's L1 cache 610, as illustrated by cache line $912_C$. While the interaction with consumer's L1 cache is shown here, it is understood that cache line 912 could be moved via the CLPUSH operation to any of consumer's local or private cache (e.g., L2 cache), by utilizing similar combination of prefetch hints/RFO request shown in FIG. 9.

Next, the consumer core 608 seeks access to cache line 612. It issues a read request 932 to its L1 cache agent 610A.

Since a copy of cache line (i.e. $612_c$) is already in consumer's L1 cache thread, the read request results in a hit. As such, agent 610A does not have to fetch cache line 612 from L3 cache 606 and thus eliminating access message 934 and corresponding response 936, as depicted by 940. Instead, agent 610A responds directly to read request 932 with its copy of cache line $612_{L3}$ in message 942.

Figure 10A:
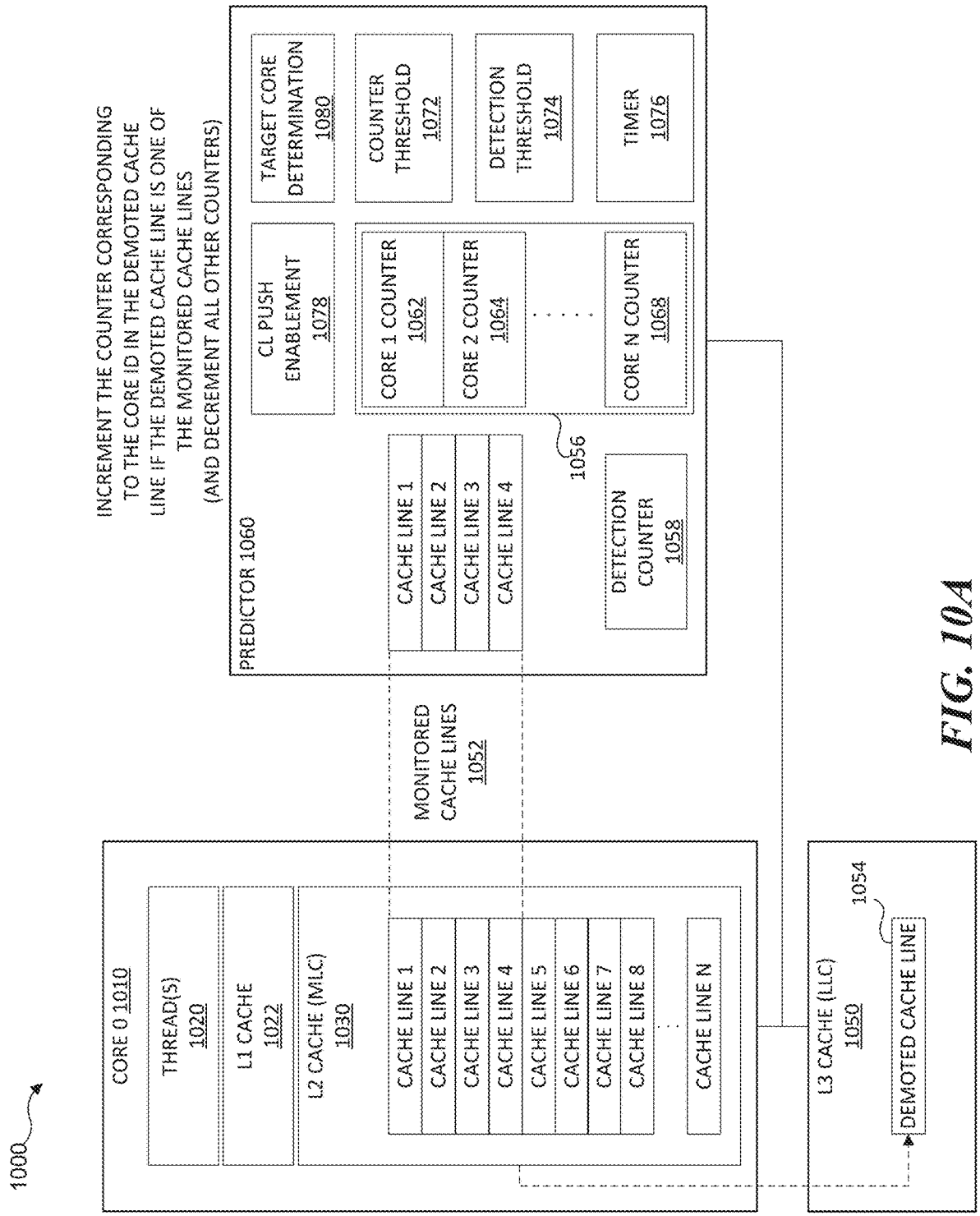
FIGS. 10A and 10B are schematic diagrams illustrating exemplary embodiments of a hardware configuration for tracking activities relating to a plurality of monitored cache lines.
Figure 10B:
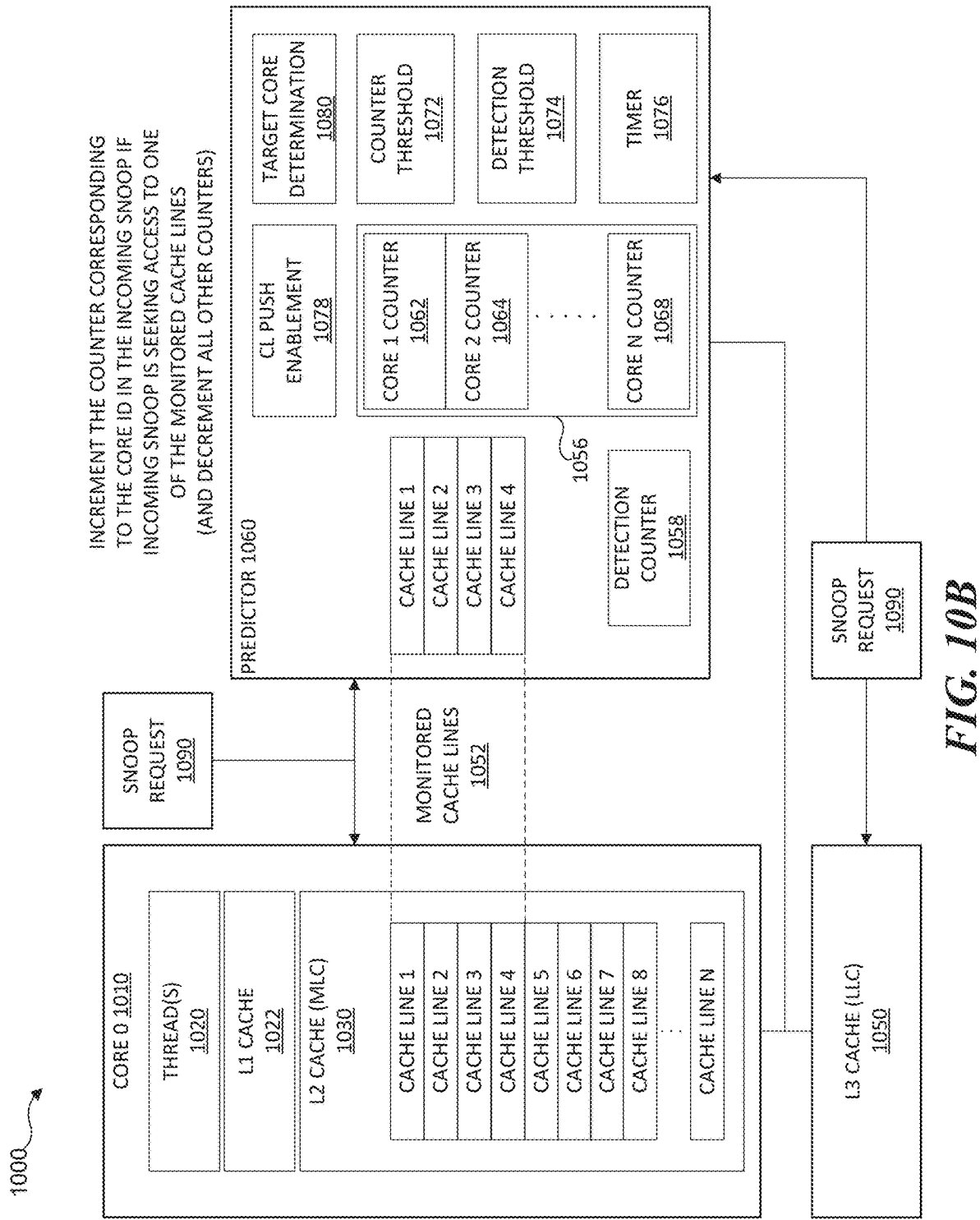

FIGS. 10A and 10B illustrate exemplary embodiments of a hardware configuration or system for tracking activities relating to a plurality of monitored cache lines. Both figures illustrate similar hardware configurations with the main difference being in the activities tracked. In FIG. 10A, the activities being tracked are demotions of the monitored cache lines from a core's private cache into a shared cache. In FIG. 10B, the activities being tracked are snoop requests for the monitored cache lines from remote cores.

In both 10A and 10B, the hardware configuration 1000 includes a CPU core 1010, an L3 cache (LLC) 1050, and a predictor 1060. The CPU core 1010 further includes processing thread(s) 1020, an L1 cache 1022, and an L2 cache (MLC) 1030. The L1 cache 1022 and the L2 cache 1030 constitute private or local cache of processor core 1010. The L3 cache 1050, on the other hand, constitutes the shared cache as it is shared between processor core 1010 and at least one other core (not shown). The L2 cache 1030 includes cache lines 1-N which are shown as individual blocks. Copies of these cache lines may also exist in the L1 cache 1022 as well as the L3 cache 1050. Out of cache lines 1-N, some are CLDEMOTE candidates (e.g., cache lines 1-8) that may be demoted by the execution of a CLDEMOTE instruction while other are not (e.g., cache line N). According to an embodiment, a randomly selected subset of the CLDEMOTE candidates, or sample cache lines, (e.g., cache lines 1-4) are monitored by the hardware predictor 1060.

The predictor 1060 may include a set of core counters 1056, a detection counter 1058, a target core determination logic/circuitry 1080, a CLPUSH enablement logic/circuitry 1078, a counter threshold 1072, a detection threshold 1074, and a timer 1076. The set of counters 1056 may include N counters (1062-1068) capable of tracking activities relating to monitored cache lines with respect to each of the cores 1-N. According to an embodiment, the predictor 1060 monitors a number of randomly selected sample cache lines 1052. While in FIGS. 10A and 10B, the predictor 1060 is shown as monitoring the L2 cache, this is merely for illustration purposes. In other embodiments, the predictor 1060 may instead monitor select sample cache lines from the L1 cache 1022 or the L3 cache 1050, or any other cache level for that matter.

Referring now specifically to FIG. 10A, according to an embodiment, upon the predictor 1060 detecting a cache line being demoted from the core's private cache (i.e., L1 cache 1022 or L2 cache 1030) to the shared cache (L3 cache 1050) via a CLDEMOTE instruction executed by core 1010, the predictor checks to see if the demoted cache line (e.g., 1054) is one of the sample cache lines being monitored (i.e. monitored cache lines 1052). If the demoted cache line is one of the monitored cache lines, the predictor predicts a destination for the demoted cache line based on information in, or are associated with, the demoted cache line. According to an embodiment, this is accomplished by examining the core valid (CV) bits of the demoted cache line. The CV bits may be contained in, or determined from, the meta data of the demoted cache line.

According to an embodiment, when the CPU is in default mode, the CV bits in a shared cache line contain two sets of bits for tracking the core ID of two of the cores that have cached copies of the cache line. When one of the cores acquires ownership of the cache line, the CV bits are updated to indicate the ownership-acquiring core as holding the cache line in a (F)orward, (M)odified, or (E)xclusive state, and the non-ownership-acquiring core as holding the cache line in an (I)nvalid state. This means that in a producer-consumer usage model where two cores alternate ownership of a cache line, when one core (i.e. producer) is working on the cache line, the core ID of the other core (i.e. consumer core) is still tracked by the CV bits, albeit in an (I)nvalid state. Based on this information, the predictor can assume that the core being tracked by the CV bits as under an (I)nvalid state is likely be the destination core for demoted cache line.

Referring now to specifically to FIG. 10B. According to an embodiment, upon the predictor 1060 detecting a snoop request 1090 to a cache containing the monitored cache lines (e.g., one of L1 cache 1022, L2 cache 1030, or L3 cache 1050), the predictor checks to see if the cache line being requested by the snoop request is one of the monitored sample cache lines (i.e. monitored cache lines 1052). If the requested cache line is one of the monitored cache lines, the predictor determines a destination core for the requested cache line based on the detected snoop request. According to an embodiment, this is accomplished by determining the source (i.e. sender) of the snoop request.

Referring now to both FIGS. 10A and 10B. According to an embodiment, upon determining a destination core for a monitored cache line, either through a cache line demotion or a snoop request, the predictor increments the counter that corresponds to the destination core and decrements all other counters that correspond to non-destination cores. If the destination core does not already have a corresponding counter, one is initialized and associated with the destination core. In instances where only a limited number of counters are available due to resource constraints, one of the existing counters associated with a non-destination core may need to be reused. In one embodiment, the existing counter with the lowest count value is to reset and reused to track accesses relating to the destination core. Additionally, a detection counter 1058 that is used to track the total number detected demotions or snoop requests for the sample cache lines is also incremented.

According to an embodiment, the target core determination logic circuitry 1080 determines a target core and enables the CLPUSH operation when certain triggering events occur. In one embodiment, the target core determination logic circuitry 1080 continuously monitors the core counters 1056 and the detection counter 1058, and compares these counter values with corresponding thresholds, such as the counter threshold 1072 for the core counters and the detection threshold 1074 for the detection counter.

In one embodiment, a triggering event occurs when a core counter exceeds the counter threshold 1072 as a result of an increment. In response to this triggering event, the core that corresponds to the said core counter is deemed by the target core determination logic circuitry 1080 to be the target core to which subsequently CLDEMOTED cache lines from core 1010 should be pushed. Additionally, the target core determination logic circuitry 1080 signals the CLPUSH enablement logic circuitry 1078 to enable the CLPUSH operation if it is not already enabled. In an embodiment, the CLPUSH enablement logic circuitry 1078 sets the core determined by the target core determination logic circuitry 1080 as the target core and directs subsequent demoted cache lines from core 1010 to be pushed to the target core through techniques such as direct cache-to-cache transfer or prefetches based on prefetch hints described above.

Alternatively, or in addition to the core counter exceeding the counter threshold, a triggering event may occur when: 1) the detection counter 1058 exceeds the detection threshold 1074, 2) the timer 1076 expires, or 3) any of the core counters 1056 fall below a minimum counter threshold. If any of these trigger events occur, according to an embodiment, the target core determination logic circuitry 1080 sets the core corresponding to the highest core counter value at the time of the triggering event as target core. In some embodiments, the highest core counter value must be significantly higher than the next highest core counter value in order for the corresponding core to be deemed the target core. When multiple core counters are within a small range of the highest counter value, there is a high likelihood that multiple consumers for the cache lines from the producer core exist. In such a case, it may be more beneficial for cache lines demoted by the producer core to remain in the LLC for different consumer cores to fetch rather than to be pushed to any one particular core. On the other hand, in situations where the consumer core's access latency is crucial and the connections between the caches are relatively idle, these shared cache lines may be multi-casted to multiple target cores. In one embodiment, the multiple target cores are determined based on their corresponding core counter values being in a certain top-range (e.g., cores corresponding to top three counter values).

Figure 11:
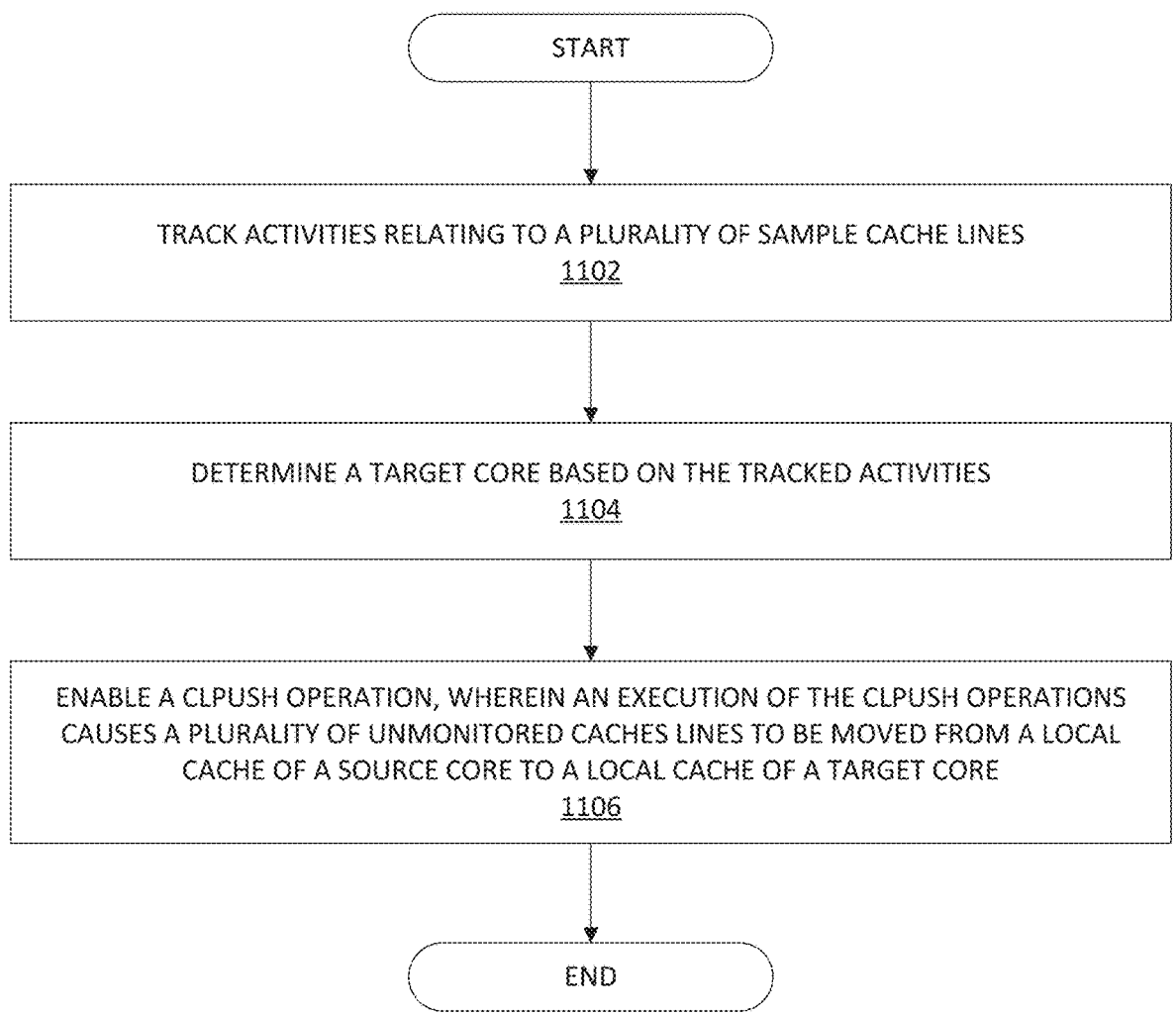
FIG. 11 is a flow chart illustrating an embodiment of a method for enabling a cache line push operation.

FIG. 11 is a flow chart illustrating an embodiment of method for enabling a cache line push operation. The method may be implemented in any hardware configuration or system described above. In block 1102, activities relating to a plurality of monitored sample cache lines are tracked. In block 1104, a target core is determined based on the tracked activities. In block 1106, upon determining the target core based on the tracked activities, a CLPUSH operation is enabled. An execution of the CLPUSH operation causes one or more unmonitored cache lines to be moved from the local or private cache of a producer core to the local or private cache of a consumer core. In some embodiments, unmonitored cache lines may first be moved to a shared cache before being moved to the local or private cache of the consumer core.

Figure 12:
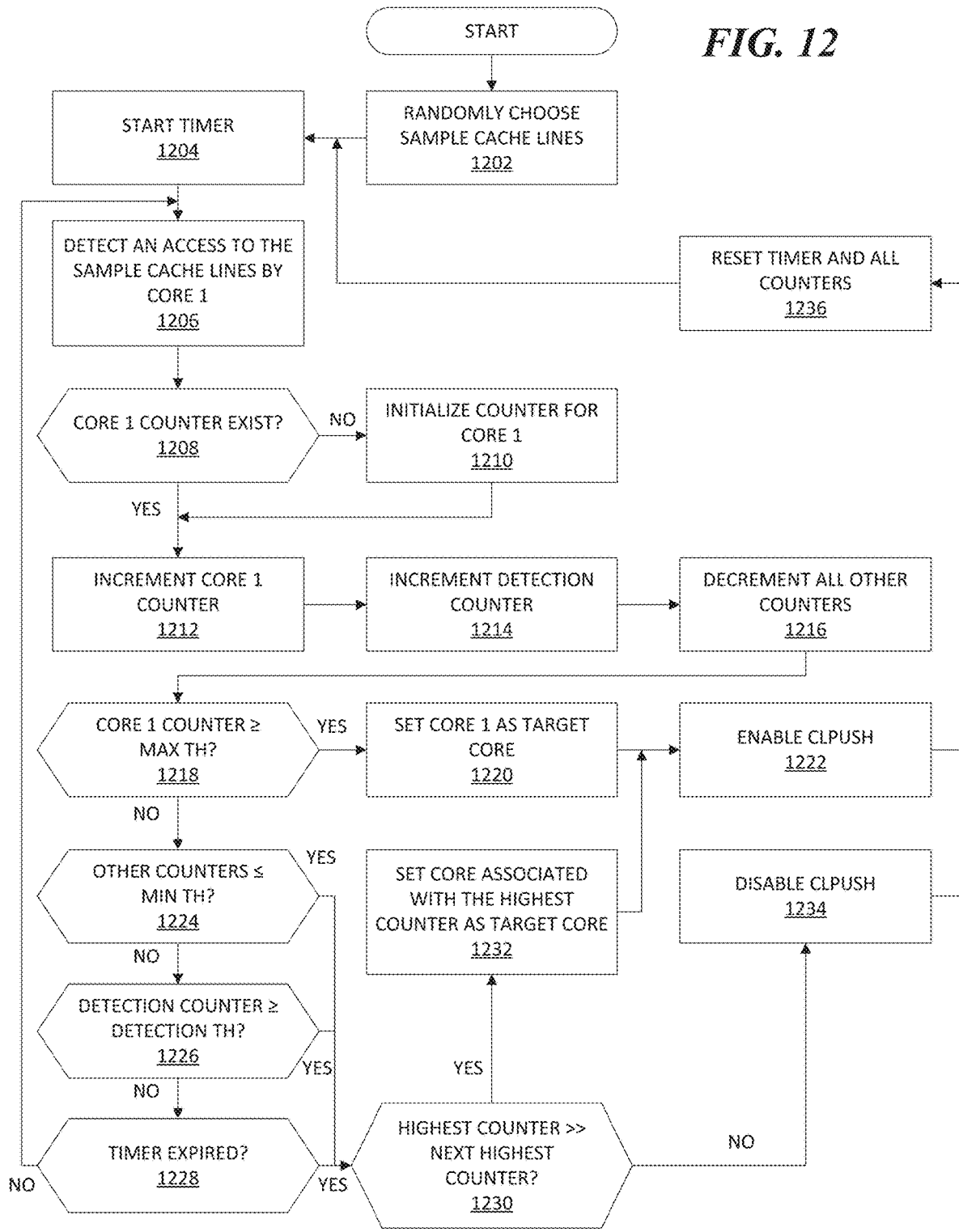
FIG. 12 is a flow chart illustrating operations and logic for implementing a hardware predictor based on tracking snoop requests according to one embodiment.

FIG. 12 is a flow chart illustrating operations and logic for implementing a hardware predictor based on tracking snoop requests according to one embodiment. In block 1202 the predictor selects one or more random sample cache lines from a group of cache line in a cache. The group of cache lines from which the sample cache lines are selected may be a group of candidates for a cache line demotion instruction. The selected sample cache lines are continuously monitored by a predictor. In some embodiments, the selected sample cache lines are excluded from demotion by the cache line demotion instruction. The number of sample cache lines selected may depend on factors such as the size of the different caches, e.g. MLC and LLC. The selected sample cache lines may be replaced periodically with new sample cache lines. The predictor may also initialize a plurality of counters for tracking accesses to the sample cache lines made by a plurality of accessing cores. The initial value of the counters may depend on factors such as the threshold selected and the size of the caches. A counter may be reset whenever it is used to track a different core. At block 1204, a timer is initiated by the predictor. At block 1206, an access from a core (i.e. core 1) to one of the sample cache lines is detected by the predictor. In block 1208, a determine is made on whether there is an existing counter that corresponds to core 1 and tracks the number of accesses to the sample cache lines made by core 1. If no such counter exists, one is created and initialized for core 1 at block 1210. In some embodiments, as described above, this may require reusing an existing counter that corresponds to another core. At block 1212, the counter corresponding to core 1, either existing or newly created/initialized, is incremented. At block 1214, a detection counter is also incremented. At block 1216, any other counter that corresponds to cores other than core 1 is decremented. At block 1218, a determination is made on whether the counter corresponding to core 1 exceeds a max counter threshold. If this determination is true, then core 1 is set as the target core at 1220 and the CLPUSH operation is enabled at block 1222. However, if the counter corresponding to core 1 does not exceed the max counter threshold at block 1218, then several additional determinations are made. These additional determinations include: at block 1224, whether any of the counters for cores other than core 1 fall below a minimum counter threshold; at block 1224, whether the detection counter exceeds a detection threshold; and at block 1226, whether the timer has expired. If the results of all of these determinations are false, then the predictor returns to monitoring accesses to the sample cache lines at block 1206. However, if any of these determinations are true, then a further determination is made at block 1230 on whether the highest counter value out of the plurality of counters exceeds the next highest counter value by a predetermined margin. If the determination at block 1230 results in a yes, then the core that corresponds to the counter with the highest counter value is set as the target core at block 1232, and the CLPUSH operation is enabled at block 1222. If the determination at block 30 results in a no, then the CLPUSH operation is disabled at block 1234. After the CLPUSH operation has been enabled or disabled, all of the counters, as well as the timer, are reset at block 1236. The process then continues at block 1204 by restarting the timer.

Figure 13:
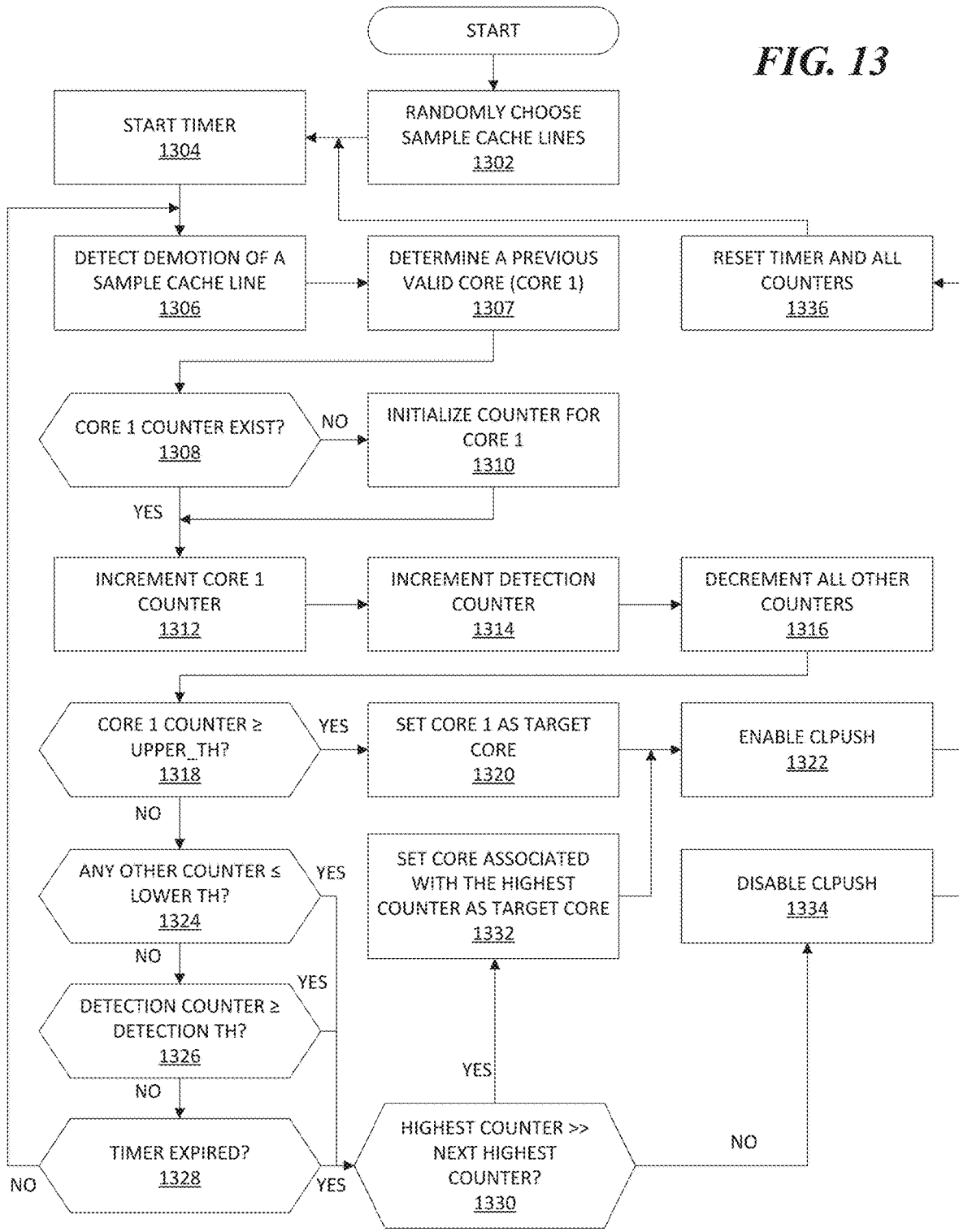
FIG. 13 is a flow chart illustrating operations and logic for implementing the hardware predictor based on tracking demoted cache lines according to an embodiment.

FIG. 13 is a flow chart illustrating operations and logic for implementing the hardware predictor based on tracking demoted cache lines according to an embodiment. At block 1302 the predictor selects one or more random sample cache lines from a group of cache line in a cache. The group of cache lines from which the sample cache lines are selected may be a group of candidates for a cache line demotion instruction. The selected sample cache lines are continuously monitored by a predictor. The number of sample cache lines selected may depend on factors such as the size of the different caches, e.g. MLC and LLC. The selected sample cache lines may be replaced periodically with new sample cache lines, such as when a sample cache line has been demoted. The predictor may also initialize a plurality of counters to track, for each potential destination core, the number of demoted cache lines it has had previous ownership of. The initial value of the counters may depend on factors such as the threshold selected and the size of the caches. A counter may be reset whenever it is used to track a different core. At block 1304, a timer is initiated by the predictor. At block 1306, a demotion of a sample cache line to the LLC is detected by the predictor. At block 1307, the predictor determines the core ID of a core (i.e., core 1) that had previously owned a valid copy of the demoted cache line based on information in, or associated with, the demoted cache line. In one embodiment, this is determined based on the core valid bits in the demoted cache line, as described above. At block 1308, a determine is made on whether there is an existing counter that corresponds to core 1 for tracking the number of demoted cache lines that core 1 may previously have ownership of. If no such counter exists for core 1, one is created and initialized at block 1310. In some embodiments, as described above, this may require taking a counter that corresponds to another core. At block 1312, the counter corresponding to core 1, either existing or newly created/initialized, is incremented. At block 1314, a detection counter is also incremented. At block 1316, any other counters that correspond to cores other than core 1 are decremented. At block 1318, a determination is made on whether the counter corresponding to core 1 exceeds a max counter threshold. If this determination is true, then core 1 is set as the target core at block 1320 and the CLPUSH operation is enabled at block 1322. However, if the counter corresponding to core 1 does not exceed the max counter threshold at block 1318, then several additional determinations are made. These additional determinations include: at block 1324, whether any of the counters for cores other than core 1 fall below a minimum counter threshold; at block 1324, whether the detection counter exceeds a detection threshold; and at block 1326, whether the timer has expired. If the results of these determinations are all false, then the predictor returns to monitoring cache line demotions at block 1306. However, if any of these determinations returns true, then a determination is made at block 1330 on whether the highest counter value out of the plurality of counters exceeds the next highest counter value by a pre-determined margin. If the determination at block 1330 results in a yes, then the core that corresponds to the counter with the highest counter value is set as the target core at block 1332, and the CLPUSH operation is enabled at block 1322. If the determination at block 1330 results in a no, then the CLPUSH operation is disabled at block 1334. After the CLPUSH operation has either been enabled or disabled, the timer and all of the counters are reset at block 1336. The process then continues at block 1304 by restarting the timer.

An exemplary embodiment of the present invention is an apparatus that includes: a plurality of hardware processor cores each including a private cache; a shared cache that is communicatively coupled to and shared by the plurality of hardware processor cores; and predictor circuitry to track activities relating to a plurality of monitored cache lines in the private cache of a producer hardware processor core (producer core) and to enable a cache line push operation upon determining a target hardware processor core (target core) based on the tracked activities, such that an execution of the cache line push operation is to cause a plurality of unmonitored cache lines in the private cache of the producer core to be moved to the private cache of the target core. The shared cache may be a last-level cache (LLC) and the private cache may be a higher level cache than the LLC, such as a level 1 or level 2 cache. The plurality of monitored cache lines in the private cache of the producer core may be randomly selected. Alternatively, or in addition to, the plurality of unmonitored cache lines may be specifically selected based on an algorithm. The plurality of unmonitored cache lines may be moved from the private cache of the producer core to the private cache of the target core through direct cache-to-cache transfer. The direct to cache-to-cache transfer may involve allocating into the shared cache to temporarily store the plurality of unmonitored cache lines. The plurality of unmonitored cache lines may also be moved from the private cache of the first processor core to the private cache of the second hardware processor core by the first processor core demoting the plurality of unmonitored cache lines to the shared cache and issuing prefetch hints to the second hardware processor core. The second hardware processor core may then to fetch the unmonitored cache lines from the shared cache in response to these prefetch hints. The predictor circuit may include a plurality of counters each of which corresponds to one of the plurality of hardware processor cores and is to track a number of activities relating to the monitored cache lines and associated with the hardware processor core corresponding to the counter.

To determine a target core based on tracked activities, the predictor circuit may store addresses of the plurality of monitored cache lines, detect an activity relating to one of the stored addresses, determine a consumer hardware processor core (consumer core) based on the detected activity, increment a first counter corresponding to the consumer core, and set the consumer core as the target core upon the first counter exceeding a maximum counter threshold as a result of the increment. The predictor circuitry may also increment a total activities counter and responsively set a first hardware processor core corresponding to a counter with a highest number of counts as the target core, upon the total activities counter exceeding an activities threshold. Alternatively, or in addition to, the predictor circuitry may detect expiration of a timer and responsively set a first hardware processor core corresponding to a counter with a highest number of counts as the target core upon expiration of the timer. Furthermore, the predictor circuitry may also decrement any counters that do not correspond to the consumer core and responsively set a first hardware processor core corresponding to a counter with a highest number of counts as the target core, upon any of the plurality of counters falling below a minimum counter threshold. The detected activity may include an access to one of the plurality of monitored cache lines by an accessing hardware processor core (accessing core) and the consumer core is determined based on a source of the access. Alternatively, or in addition to, the detected activity may include a demotion of one of the plurality of monitored cache lines and the consumer core is determined based on core valid bits associated with the demoted cache line.

An embodiment of the present invention may also include a computer system that includes a system memory and one or more processors. Each of the processors may include a memory interface to communicatively couple the processor to the system memory. Additionally, each of the processor may further include all of the components in the exemplary apparatus embodiment described above, such as a plurality of hardware processor cores each including a private cache; a shared cache that is communicatively coupled to and shared by the plurality of hardware processor cores; and predictor circuitry to track activities relating to a plurality of monitored cache lines in the private cache of a producer hardware processor core (producer core) and to enable a cache line push operation upon determining a target hardware processor core (target core) based on the tracked activities.

Another embodiment of the present invention is a method implemented in a hardware processor. The method includes tracking activities relating to a plurality of monitored cache lines in a private cache of a producer hardware processor core (producer core) and enabling a cache line push operation upon determining a target hardware processor core (target core) based on the tracked activities, such that an execution of the cache line push operation is to cause a plurality of unmonitored cache lines in the private cache of the producer processor core to be moved to a private cache of the target core. The plurality of monitored cache lines in the private cache of the producer core may be selected at randomly or specifically selected based on an algorithm. The method may further include executing a direct cache-tocache transfer instruction to move the plurality of unmonitored cache lines in the private cache of the producer core to the private cache of the target processor core. Such transfer may additionally involve first allocating space in a shared cache shared by the producer core and the target core to temporarily store the plurality of unmonitored cache lines. Instead of, or in addition to, executing a direct cache-to-cache transfer instruction, the method may include demoting the plurality of unmonitored cache lines from the private cache of the producer hardware processor core to a shared cache shared by the producer core and the target core and issuing prefetch hints to the target core. The target core may then fetch the unmonitored cache lines from the shared cache in response to the prefetch hints. The shared cache may be a last-level cache (LLC) and the private cache may be a higher level cache than the LLC, such as a level 1 or level 2 cache.

To determine the target core based on the tracked activities, the method may further include: storing addresses of the plurality of monitored cache lines; detecting an activity relating to one of the stored addresses; determining a consumer hardware processor core (consumer core) based on the detected activity; incrementing a first counter corresponding to the consumer core, the first counter tracking a number of accesses to the plurality of monitored cache lines by the consumer core; and setting the consumer core as the target core upon the first counter exceeding a maximum counter threshold as a result of the increment. The method may also include incrementing a total activities counter and responsively setting a first hardware processor core corresponding to a counter with a highest number of counts as the target core, upon the total activities counter exceeding an activities threshold. Alternatively, or in addition to, the method may include detecting expiration of a timer and responsively setting a first hardware processor core corresponding to a counter with a highest number of counts as the target core upon expiration of the timer. Furthermore, the method may also include decrementing a plurality of other counters where each of the other counters tracking a number of accesses by a respective one of hardware processing cores other than the consumer core, and responsively setting a first hardware processor core corresponding to a counter with a highest number of counts as the target core, upon any of the plurality of other counters falling below a minimum counter threshold. The detected activity may include an access to one of the plurality of monitored cache lines by an accessing hardware processor core (accessing core) and the consumer core is determined based on a source of the access. Alternatively, or in addition to, the detected activity may include a demotion of one of the plurality of monitored cache lines and the consumer core is determined based on core valid bits associated with the demoted cache line.

Another embodiment of the present invention is a non-transitory machine readable medium storing code thereon which, when executed by a machine, causes the machine to perform a method, such as the exemplary method embodiment described above.

Yet another embodiment of the present invention is an apparatus for enabling core-to-core data transfer optimization. The apparatus includes: means for tracking activities relating to a plurality of monitored cache lines in a private cache of a producer hardware processor core (producer core); and means for enabling a cache line push operation upon determining a target hardware processor core (target core) based on the tracked activities, such that an execution of the cache line push operation is to cause a plurality of unmonitored cache lines in the private cache of the producer processor core to be moved to a private cache of the target core. The apparatus may further include means for randomly selecting the plurality of monitored cache lines in the private cache of the producer core and/or means for specifically selecting the plurality of monitored cache lines in the private cache of the producer core based on an algorithm. The apparatus may also include means for executing a direct cache-to-cache transfer instruction to move the plurality of unmonitored cache lines in the private cache of the producer core to the private cache of the target processor core, which may additionally include means for allocating space in a shared cache shared by the producer core and the target core to temporarily store the plurality of unmonitored cache lines. Instead of, or in addition to, means for executing a direct cache-to-cache transfer instruction, the apparatus may include means for demoting the plurality of unmonitored cache lines from the private cache of the producer hardware processor core to a shared cache shared by the producer core and the target core, as well as means for issuing prefetch hints to the target core, such that the target core is to fetch the unmonitored cache lines from the shared cache in response to the prefetch hints. The shared cache may be a last-level cache (LLC) and the private cache may be a higher level cache than the LLC, such as a level 1 or level 2 cache.

To determine the target core based on the tracked activities, the apparatus may further include: means for storing addresses of the plurality of monitored cache lines; means for detecting an activity relating to one of the stored addresses; means for determining a consumer hardware processor core (consumer core) based on the detected activity; means for incrementing a first counter corresponding to the consumer core which tracks a number of accesses to the plurality of monitored cache lines by the consumer core; and means for setting the consumer core as the target core upon the first counter exceeding a maximum counter threshold as a result of the increment. The apparatus may also include means for incrementing a total activities counter and means for responsively setting a first hardware processor core corresponding to a counter with a highest number of counts as the target core, upon the total activities counter exceeding an activities threshold. Alternatively, or in addition to, the apparatus may include means for detecting expiration of a timer and means for responsively setting a first hardware processor core corresponding to a counter with a highest number of counts as the target core upon expiration of the timer. Furthermore, the apparatus may also include means for decrementing a plurality of other counters where each of the other counters tracking a number of accesses by a respective one of hardware processing cores other than the consumer core, and means for responsively setting a first hardware processor core corresponding to a counter with a highest number of counts as the target core, upon any of the plurality of other counters falling below a minimum counter threshold. The detected activity may include an access to one of the plurality of monitored cache lines by an accessing hardware processor core (accessing core) and the consumer core is determined based on a source of the access. Alternatively, or in addition to, the detected activity may include a demotion of one of the plurality of monitored cache lines and the consumer core is determined based on core valid bits associated with the demoted cache line.

Figure 14:
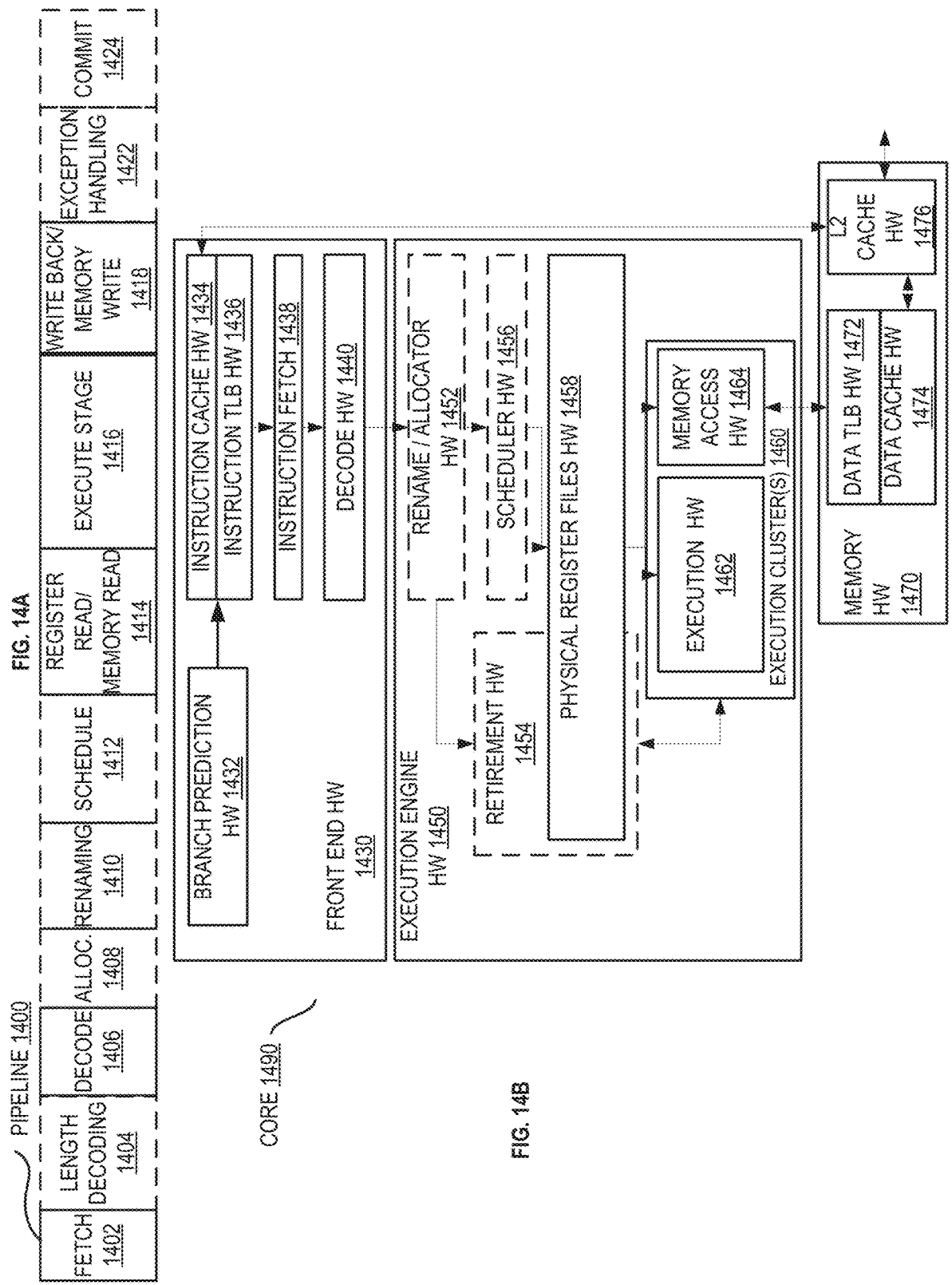
FIG. 14A is a block diagram illustrating both an exemplary in-order pipeline and an exemplary register renaming, out-of-order issue/execution pipeline according to embodiments of the invention.
FIG. 14B is a block diagram illustrating both an exemplary embodiment of an in-order architecture core and an exemplary register renaming, out-of-order issue/execution architecture core to be included in a processor according to embodiments of the invention.

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-oforder issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end hardware 1430 coupled to an execution engine hardware 1450, and both are coupled to a memory hardware 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end hardware 1430 includes a branch prediction hardware 1432 coupled to an instruction cache hardware 1434, which is coupled to an instruction translation lookaside buffer (TLB) 1436, which is coupled to an instruction fetch hardware 1438, which is coupled to a decode hardware 1440. The decode hardware 1440 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode hardware 1440 or otherwise within the front end hardware 1430). The decode hardware 1440 is coupled to a rename/allocator hardware 1452 in the execution engine hardware 1450.

The execution engine hardware 1450 includes the rename/allocator hardware 1452 coupled to a retirement hardware 1454 and a set of one or more scheduler hardware 1456. The scheduler hardware 1456 represents any number of different schedulers, including reservations stations, central instruction window, etc. The scheduler hardware 1456 is coupled to the physical register file(s) hardware 1458. Each of the physical register file(s) hardware 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1458 comprises a vector registers hardware, a write mask registers hardware, and a scalar registers hardware. This register hardware may provide architectural vector registers, vector mask registers, and general purpose registers. The physical register file(s) hardware 1458 is overlapped by the retirement hardware 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1454 and the physical register file(s) hardware 1458 are coupled to the execution cluster(s) 1460. The execution cluster(s) 1460 includes a set of one or more execution hardware 1462 and a set of one or more memory access hardware 1464. The execution hardware 1462 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1456, physical register file(s) hardware 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1464). It should also be understood that where separate pipelines are used, one or more of these pipelines may be out-of-order issue/execution and the rest in-order.

The set of memory access hardware 1464 is coupled to the memory hardware 1470, which includes a data TLB hardware 1472 coupled to a data cache hardware 1474 coupled to a level 2 (L2) cache hardware 1476. In one exemplary embodiment, the memory access hardware 1464 may include a load hardware, a store address hardware, and a store data hardware, each of which is coupled to the data TLB hardware 1472 in the memory hardware 1470. The instruction cache hardware 1434 is further coupled to a level 2 (L2) cache hardware 1476 in the memory hardware 1470. The L2 cache hardware 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode hardware 1440 performs the decode stage 1406; 3) the rename/allocator hardware 1452 performs the allocation stage 1408 and renaming stage 1410; 4) the scheduler hardware 1456 performs the schedule stage 1412; 5) the physical register file(s) hardware 1458 and the memory hardware 1470 perform the register read/memory read stage 1414; the execution cluster 1460 perform the execute stage 1416; 6) the memory hardware 1470 and the physical register file(s) hardware 1458 perform the write back/memory write stage 1418; 7) various hardware may be involved in the exception handling stage 1422; and 8) the retirement hardware 1454 and the physical register file(s) hardware 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1434/1474 and a shared L2 cache hardware 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 15:
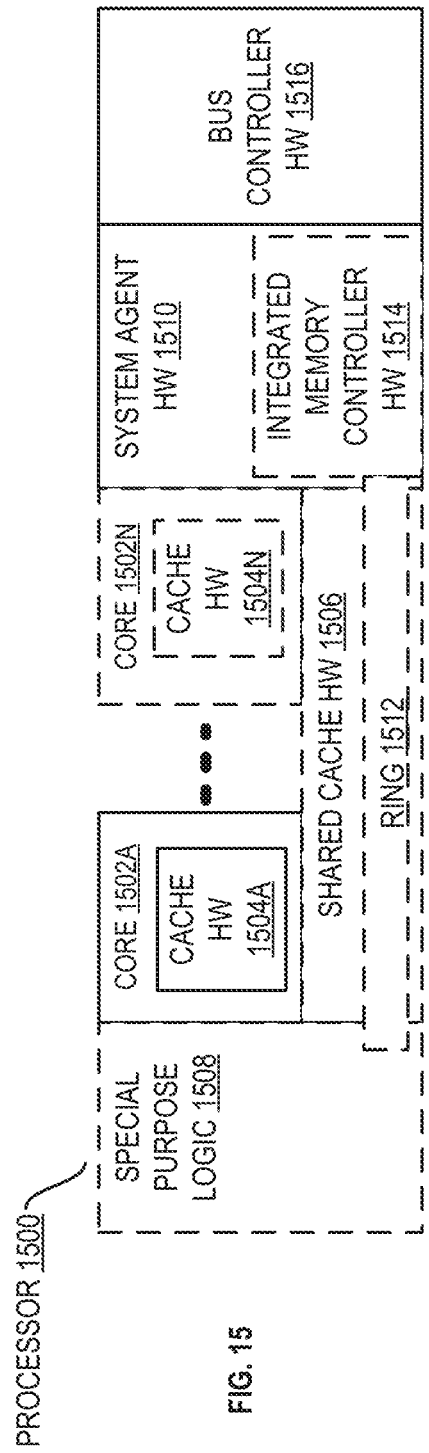
FIG. 15 is a block diagram of a single core processor and a multicore processor with integrated memory controller and graphics according to embodiments of the invention.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller hardware 1516, while the optional addition of the dashed lined boxes illustrates an alternative processor 1500 with multiple cores 1502A-N, a set of one or more integrated memory controller hardware 1514 in the system agent hardware 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1506, and external memory (not shown) coupled to the set of integrated memory controller hardware 1514. The set of shared cache hardware 1506 may include one or more mid-level caches, such as level 2 (L2), level 3 (L3), level 4 (L4), or other levels of cache, a last level cache (LLC), and/or combinations thereof. While in one embodiment a ring based interconnect hardware 1512 interconnects the integrated graphics logic 1508, the set of shared cache hardware 1506, and the system agent hardware 1510/integrated memory controller hardware 1514, alternative embodiments may use any number of well-known techniques for interconnecting such hardware. In one embodiment, coherency is maintained between one or more cache hardware 1506 and cores 1502-A-N.

In some embodiments, one or more of the cores 1502A-N are capable of multithreading. The system agent 1510 includes those components coordinating and operating cores 1502A-N. The system agent hardware 1510 may include for example a power control unit (PCU) and a display hardware. The PCU may be or include logic and components needed for regulating the power state of the cores 1502A-N and the integrated graphics logic 1508. The display hardware is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set. In one embodiment, the cores 1502A-N are heterogeneous and include both the "small" cores and "big" cores described below.

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
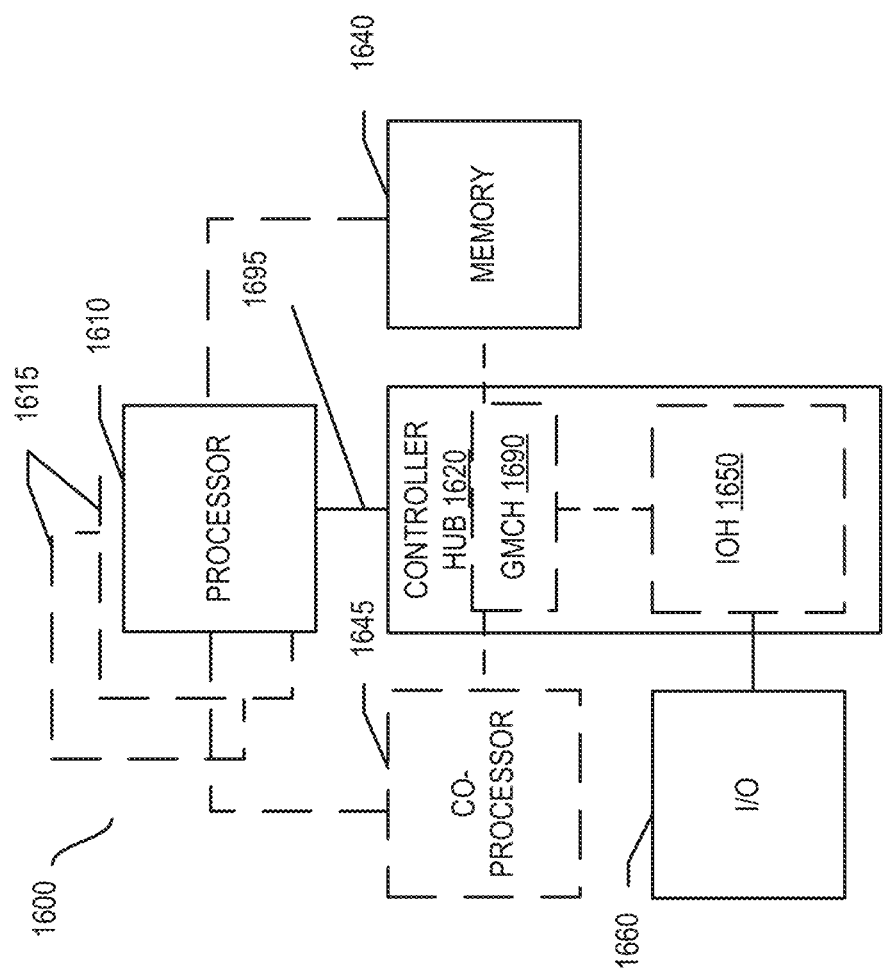
FIG. 16 illustrates a block diagram of a system in accordance with one embodiment of the present invention.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s)

1610, 1615 via a multi-drop bus, such as a frontside bus (FSB), point-to-point interface, or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
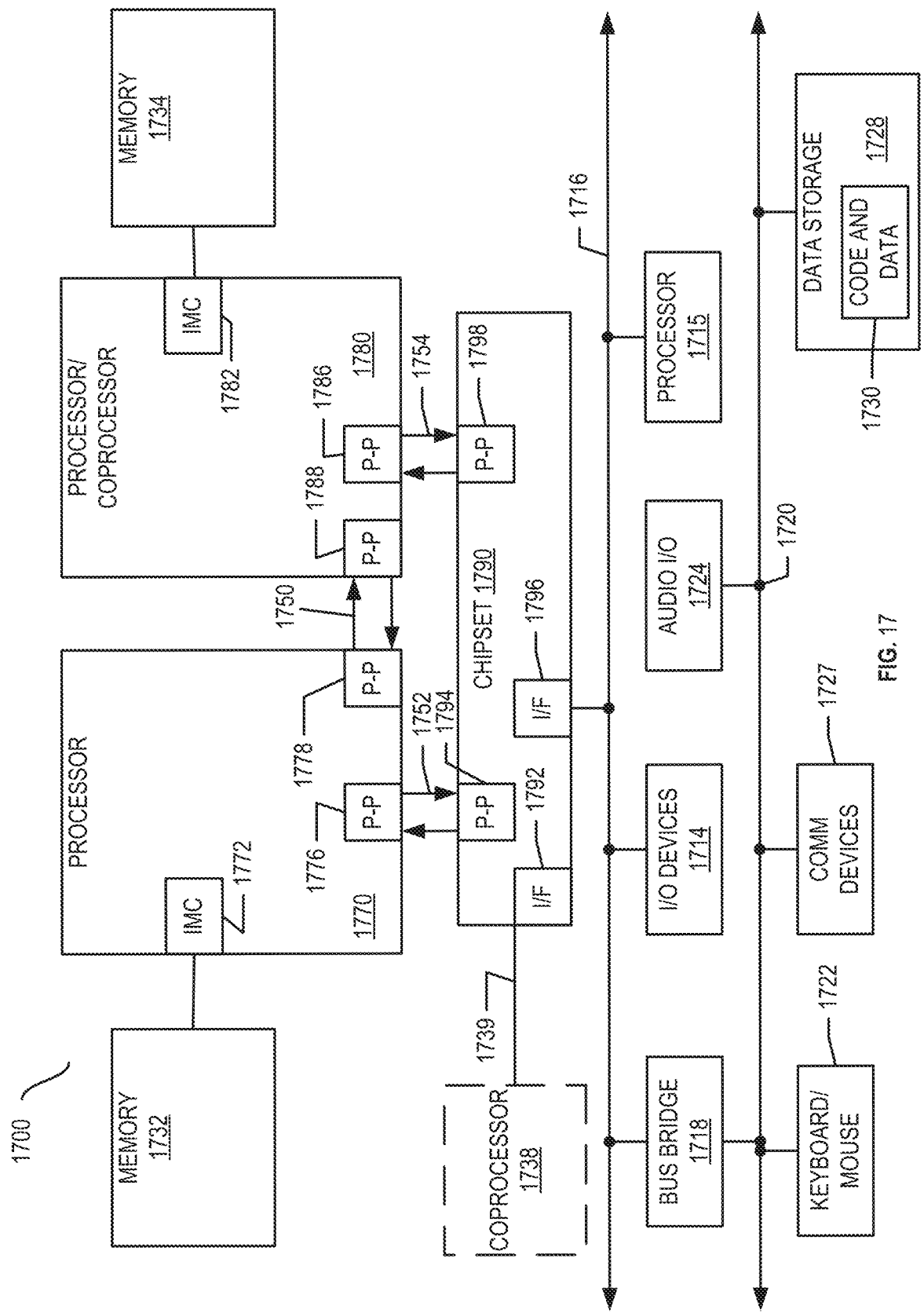
FIG. 17 illustrates a block diagram of a second system in accordance with an embodiment of the present invention.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) hardware 1772 and 1782, respectively. Processor 1770 also includes as part of its bus controller hardware point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) hardware), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage hardware 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
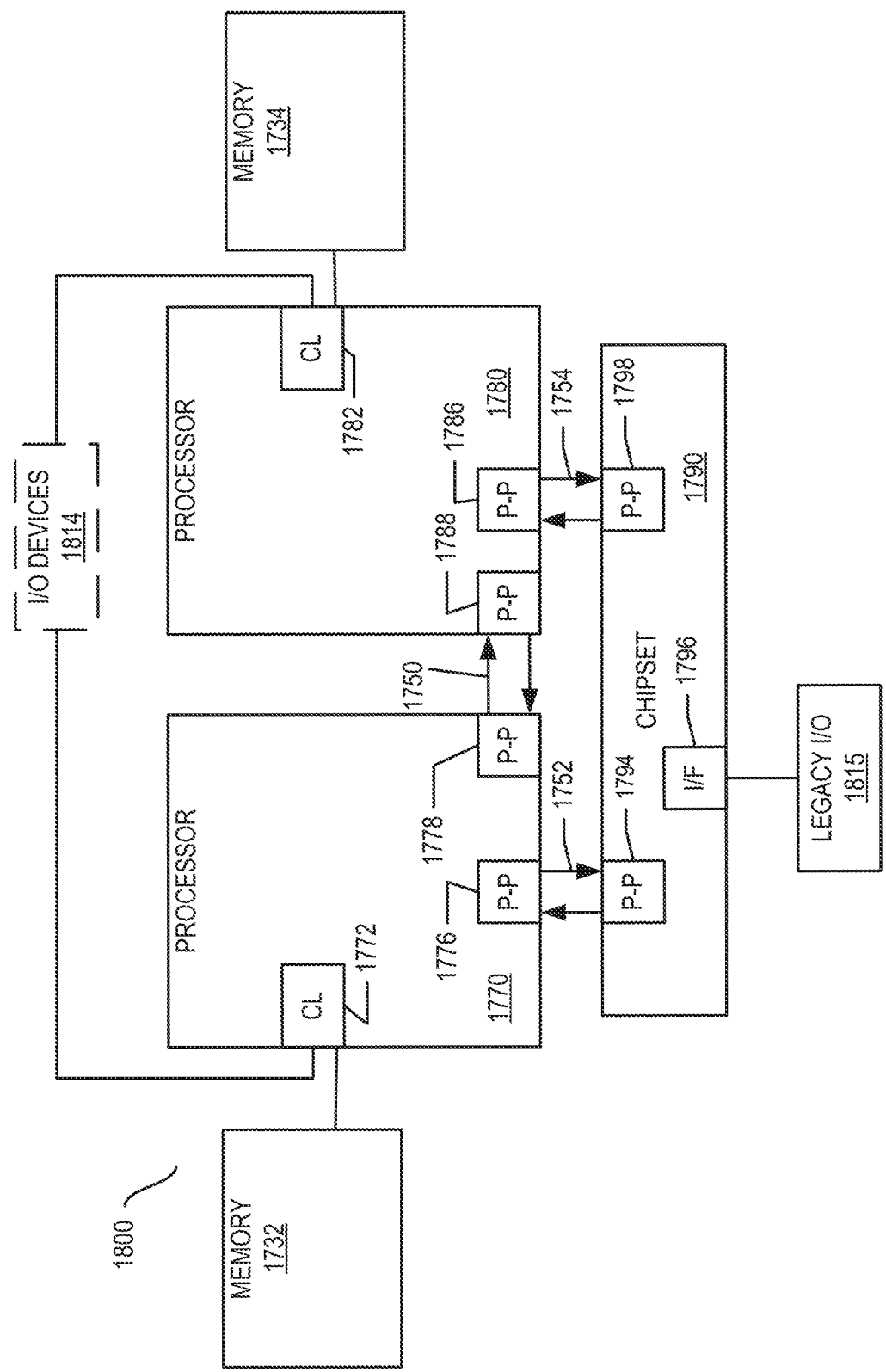
FIG. 18 illustrates a block diagram of a third system in accordance with an embodiment of the present invention.

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller hardware and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
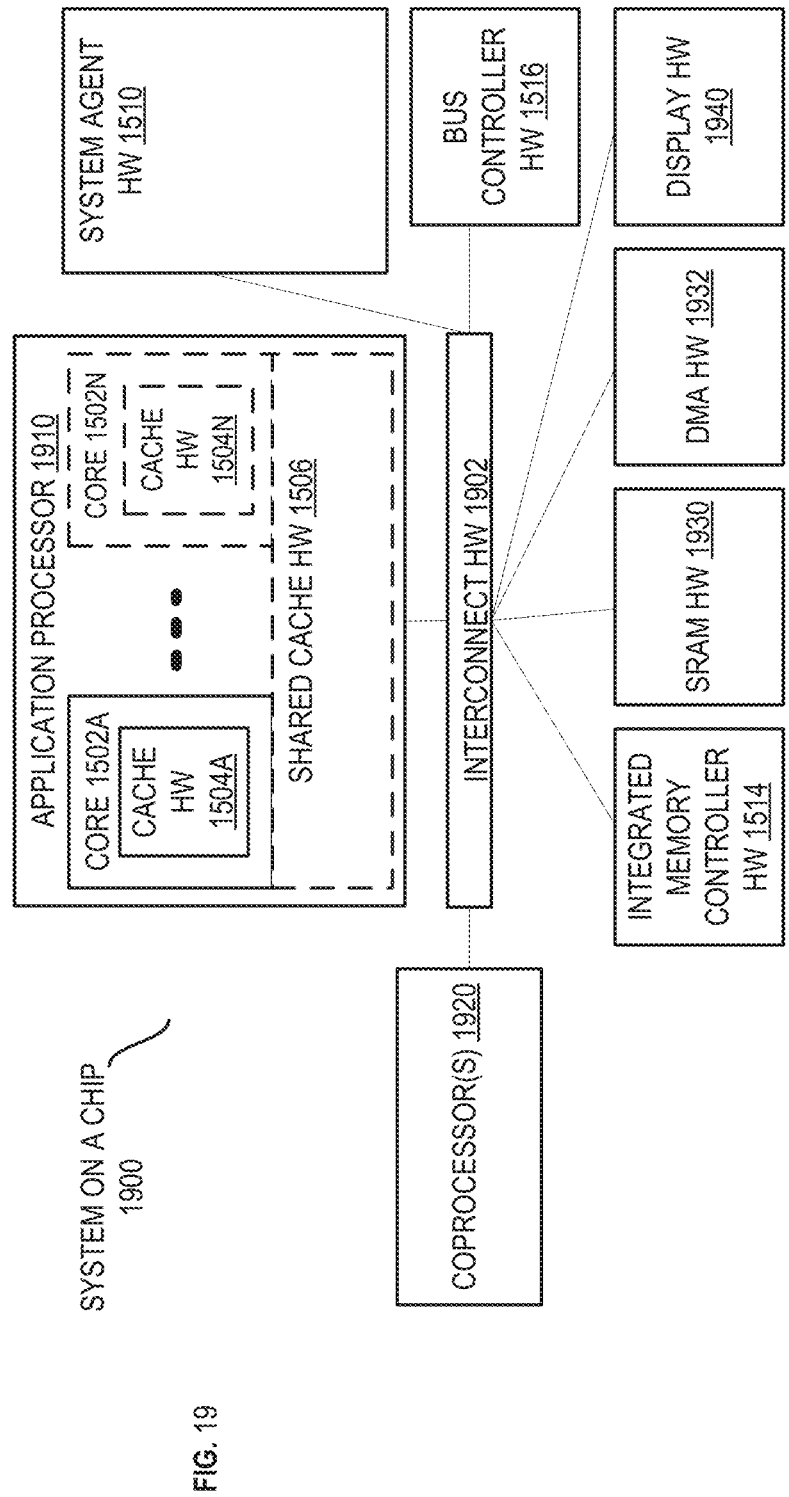
FIG. 19 illustrates a block diagram of a system on a chip (SoC) in accordance with an embodiment of the present invention.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect hardware 1902 is coupled to: an application processor 1910 which includes a set of one or more cores 1502A-N and shared cache hardware 1506; a system agent hardware 1510; a bus controller hardware 1516; an integrated memory controller hardware 1514; a set or one or more coprocessors 1920 which may include integrated graphics logic, an image processor, an audio processor, and a video processor; an static random access memory (SRAM) hardware 1930; a direct memory access (DMA) hardware 1932; and a display hardware 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus comprising:
    a plurality of hardware processor cores, each of the plurality of hardware cores to include private cache;
    a shared cache, communicatively coupled to and shared by the plurality of hardware processor cores; and
    predictor circuitry to track activities relating to a plurality of monitored cache lines in the private cache of a producer hardware processor core (producer core) and to enable a cache line push operation upon determining a target hardware processor core (target core) based on the tracked activities, wherein an execution of the cache line push operation is to cause a plurality of unmonitored cache lines in the private cache of the producer core to be moved to the private cache of the target core while leaving the plurality of monitored cache lines in the private cache of the producer core;
    wherein the predictor circuitry is to include a plurality of counters, each of the plurality of counters to correspond to one of the plurality of hardware processor cores, and to track a number of activities relating to the monitored cache lines and associated with the hardware processor core corresponding to the counter;
    wherein the predictor circuitry is to:
        store addresses of the plurality of monitored cache lines;
        detect an activity relating to one of the stored addresses;
        determine a consumer hardware processor core (consumer core) based on the detected activity; and
        increment a first counter corresponding to the consumer core.

2. The apparatus of claim 1, wherein the shared cache is a last-level cache (LLC) and the private cache is a higher level cache than the LLC.

3. The apparatus of claim 1, wherein the plurality of monitored cache lines in the private cache of the producer core is randomly selected.

4. The apparatus of claim 1, wherein the plurality of monitored cache lines in the private cache of the producer core is specifically selected based on an algorithm.

5. The apparatus of claim 1, wherein the plurality of unmonitored cache lines is to be moved from the private cache of the producer core to the private cache of the target core through direct cache-to-cache transfer.

6. The apparatus of claim 1, wherein the plurality of unmonitored cache lines is to be moved from the private cache of the producer core to the private cache of the target core by the producer core demoting the plurality of unmonitored cache lines to the shared cache and issuing prefetch hints to the target core, the target core is to fetch the unmonitored cache lines from the shared cache in response to the prefetch hints.

7. The apparatus of claim 1, wherein the predictor circuitry is further to:
    increment a total activities counter; and
    responsively set a first hardware processor core corresponding to a counter with a highest number of counts as the target core, upon the total activities counter exceeding an activities threshold.

8. The apparatus of claim 1, wherein the predictor circuitry is further to:
    detect expiration of a timer; and
    responsively set a first hardware processor core corresponding to a counter with a highest number of counts as the target core upon expiration of the timer.

9. The apparatus of claim 1, wherein the predictor circuitry is further to:
    decrement any counters that do not correspond to the consumer core; and
    responsively set a first hardware processor core corresponding to a counter with a highest number of counts as the target core, upon any of the plurality of counters falling below a minimum counter threshold.

10. The apparatus of claim 1, wherein the detected activity comprises an access to one of the plurality of monitored cache lines by an accessing hardware processor core (accessing core) and the consumer core is determined based on a source of the access.

11. The apparatus of claim 1, wherein the detected activity comprises a demotion of one of the plurality of monitored cache lines and the consumer core is determined based on core valid bits associated with the demoted cache line.

12. A method implemented in a hardware processor, the method comprising:
    tracking activities relating to a plurality of monitored cache lines in a private cache of a producer hardware processor core (producer core); and
    enabling a cache line push operation upon determining a target hardware processor core (target core) based on the tracked activities, wherein an execution of the cache line push operation is to cause a plurality of unmonitored cache lines in the private cache of the producer processor core to be moved to a private cache of the target core while leaving the plurality of monitored cache lines in the private cache of the producer core;

wherein the tracking comprises:
- storing addresses of the plurality of monitored cache lines;
- detecting an activity relating to one of the stored addresses;
- determining a consumer hardware processor core (consumer core) based on the detected activity;
- incrementing a first counter corresponding to the consumer core, the first counter tracking a number of accesses to the plurality of monitored cache lines by the consumer core; and
- setting the consumer core as the target core upon the first counter exceeding a maximum counter threshold as a result of the increment.

13. The method of claim 12, wherein the plurality of monitored cache lines in the private cache of the producer core is randomly selected.

14. The method of claim 12, wherein the plurality of monitored cache lines in the private cache of the producer core is specifically selected based on an algorithm.

15. The method of claim 12, further comprising executing a direct cache-to-cache transfer instruction to move the plurality of unmonitored cache lines in the private cache of the producer core to the private cache of the target processor core.

16. The method of claim 12, further comprising:
- demoting the plurality of unmonitored cache lines from the private cache of the producer hardware processor core to a shared cache shared by the producer core and the target core; and
- issuing prefetch hints to the target core, wherein the target core is to fetch the unmonitored cache lines from the shared cache in response to the prefetch hints.

17. The method of claim 12, further comprising:
incrementing a total activities counter; and
responsively setting a first hardware processor core corresponding to a counter with a highest number of counts as the target core, upon the total activities counter exceeding an activities threshold.

18. The method of claim 12, further comprising:
detecting expiration of a timer; and
responsively setting a first hardware processor core corresponding to a counter with a highest number of counts as the target core upon expiration of the timer.

19. The method of claim 12, further comprising:
decrementing a plurality of other counters, each of the other counters tracking a number of accesses by a respective one of hardware processing cores other than the consumer core; and
responsively setting a first hardware processor core corresponding to a counter with a highest number of counts as the target core, upon any of the plurality of other counters falling below a minimum counter threshold.

20. The method of claim 12, wherein the detected activity comprises an access to one of the plurality of monitored cache lines by an accessing hardware processor core (accessing core) and the consumer core is determined based on a source of the access.

21. The method of claim 12, wherein the detected activity comprises a demotion of one of the plurality of monitored cache lines and the consumer core is determined from core valid bits associated with the demoted cache line.

22. A system comprising:
a system memory;
one or more processors, each processor comprising:
- a memory interface to communicatively couple the processor to the system memory;
- a plurality of hardware processor cores, each of the plurality of hardware cores to include private cache;
- a shared cache, communicatively coupled to and shared by the plurality of hardware processor cores; and
predictor circuitry to track activities relating to a plurality of monitored cache lines in the private cache of a producer hardware processor core (producer core) and to enable a cache line push operation upon determining a target hardware processor core (target core) based on the tracked activities, wherein an execution of the cache line push operation is to cause a plurality of unmonitored cache lines in the private cache of the producer core to be moved to the private cache of the target core while leaving the plurality of monitored cache lines in the private cache of the producer core;
wherein the predictor circuitry is to include a plurality of counters, each of the plurality of counters to correspond to one of the plurality of hardware processor cores, and to track a number of activities relating to the monitored cache lines and associated with the hardware processor core corresponding to the counter;
wherein the predictor circuitry is to:
- store addresses of the plurality of monitored cache lines;
- detect an activity relating to one of the stored addresses;
- determine a consumer hardware processor core (consumer core) based on the detected activity; and
- increment a first counter corresponding to the consumer core.

23. The system of claim 22, wherein the detected activity comprises an access to one of the plurality of monitored cache lines by an accessing hardware processor core (accessing core) and the consumer core is determined based on a source of the access.

24. The system of claim 22, wherein the detected activity comprises a demotion of one of the plurality of monitored cache lines and the consumer core is determined from core valid bits associated with the demoted cache line.

* * * * *